(12) United States Patent
Labelle et al.

(10) Patent No.: US 7,707,421 B2
(45) Date of Patent: Apr. 27, 2010

(54) METHOD OF ACCESSING OR SHARING A DIGITAL DOCUMENT IN A PEER-TO-PEER COMMUNICATION NETWORK

(75) Inventors: Lilian Labelle, St Pierre de Plesguen (FR); Eric Nassor, Thorigne Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 997 days.

(21) Appl. No.: 10/576,953

(22) PCT Filed: Nov. 10, 2004

(86) PCT No.: PCT/IB2004/003883

§ 371 (c)(1),
(2), (4) Date: Apr. 24, 2006

(87) PCT Pub. No.: WO2005/048565

PCT Pub. Date: May 26, 2005

(65) Prior Publication Data

US 2007/0033262 A1 Feb. 8, 2007

(30) Foreign Application Priority Data

Nov. 14, 2003 (FR) .................................. 03 13381
Nov. 14, 2003 (FR) .................................. 03 13382

(51) Int. Cl.
*H04L 9/32* (2006.01)
(52) U.S. Cl. ..................... 713/176; 713/167; 713/170; 713/181; 726/3; 726/30; 705/51
(58) Field of Classification Search ................ 713/167, 713/176, 170, 181; 726/3, 30; 705/51
See application file for complete search history.

(56) References Cited

U.S. PATENT DOCUMENTS 5,949,551 A 9/1999 Miller
(Continued)

FOREIGN PATENT DOCUMENTS

EP 1 215 876 6/2002
(Continued)

OTHER PUBLICATIONS

M.J. Swain, "Interactive Indexing into Image Databases", Department of Computer Science, University of Chicago.
(Continued)

*Primary Examiner*—Matthew B Smithers
*Assistant Examiner*—Paul Callahan
(74) *Attorney, Agent, or Firm*—Fitzpatrick, Cella, Harper & Scinto

(57) ABSTRACT

A digital document system in which a digital document in a communication network is shared between a plurality of stations, said system comprising:
  a first station (101A) having a first digital document (DD1) comprising a thumbnail data item (TH1) and an original data item (HR1);
  a second station (102A) having a second digital document (DD2) comprising a thumbnail data item (TH2); and
  a center station (100A) comprising:
    calculating means for calculating signatures of the thumbnail data items (TH1, TH2) of the first and second digital documents (DD1, DD2);
    comparing means for comparing the calculated signatures of the thumbnail data items (TH1, TH2); and
    transmitting means for transmitting information for accessing the original data item (HR1) of the first digital document (DD1) to the second station (102A) according to a result of the comparison.

7 Claims, 20 Drawing Sheets

U.S. PATENT DOCUMENTS

| | | | |
|---|---|---|---|
| 7,114,074 B2 * | 9/2006 | Alasia et al. | 713/176 |
| 2003/0011683 A1 | 1/2003 | Yamasaki | |
| 2003/0063771 A1 | 4/2003 | Morris | |
| 2004/0184478 A1 | 9/2004 | Donescu | |
| 2004/0187124 A1 | 9/2004 | Labelle | |
| 2005/0044146 A1 | 2/2005 | Nassor | |
| 2005/0044483 A1 | 2/2005 | Maze | |
| 2005/0114386 A1 | 5/2005 | Nassor | |
| 2005/0177726 A1 * | 8/2005 | Alasia et al. | 713/176 |
| 2005/0198118 A1 | 9/2005 | Viger | |
| 2005/0228753 A1 * | 10/2005 | Viger et al. | 705/51 |
| 2005/0278389 A1 | 12/2005 | Maze | |
| 2007/0050626 A1 * | 3/2007 | Tokie et al. | 713/176 |
| 2007/0061582 A1 * | 3/2007 | Ohmori et al. | 713/176 |

FOREIGN PATENT DOCUMENTS

| | | |
|---|---|---|
| JP | 2003-92719 | 3/2003 |

OTHER PUBLICATIONS

M.J. Swain, et al., "Color Indexing", International Journal of Computer Vision, 7:1, pp. 11-32, 1991.

H. S. Stone, "Fourier-Wavelet Techniques in Image Searching", IEEE International Symposium on Circuits and Systems, Jun. 9-12, 1997, Hong Kong.

* cited by examiner

| Table of users | |
|---|---|
| User Id | - Name<br>- Password<br>- Reference station Id |

| Table of stations | |
|---|---|
| Station Id | - Name<br>- IP address<br>- Port |

| Table of indices | | | |
|---|---|---|---|
| Document Id | Version Id | Station Id | Access path |

FIG. 3B

| Table of documents | | |
|---|---|---|
| Document Id | Version Id | Access path |

| Table of thumbnails | | |
|---|---|---|
| String of characters | Version Id | Version Id |

FIG. 5

METHOD OF ACCESSING OR SHARING A DIGITAL DOCUMENT IN A PEER-TO-PEER COMMUNICATION NETWORK

BACKGROUND OF THE INVENTION

The present invention relates to the accessing or to the sharing of a digital document in a communication network of distributed type commonly referred to as having "peer-to-peer" topology, and more particularly to accessing a data item of a digital document, from any station of the network, on the basis of another data item of the same digital document.

As from the last few years, peer-to-peer networks have become an alternative to the client-server systems widely used up till now. This is because, due to their distributed architecture, peer-to-peer networks make it possible to share a high quantity of digital data between a large number of users, without this necessitating a costly infrastructure.

In practice, in a peer-to-peer network, each station plays the role of client and server. Thus, each station can request a data item or a digital document from any other station of the network and the exchange of data may be carried out directly from one station to another.

In what follows, the term "document or digital data item" applies equally to images or digital videos, or to digital texts.

Generally, the same digital document comprises at least first and second data items connected to each other according to an edition relationship of hierarchical type and/or quality in terms of resolution, version, language, size or content. In practice, the original data item (referred to here as second data item of the digital document to share) has the highest resolution and the data item having the lowest resolution is referred to as a thumbnail (and corresponding here to the first data item of the digital document to share).

In the case in which the digital document is an image, the original data item corresponds to the original image, that is to say at full resolution, and the thumbnail corresponds to an image of lower resolution.

In the case in which the digital document is a video, the original data item corresponds to the sequence of original images and the thumbnail corresponds, for example, to the first image of the video at a lower resolution than the resolution of the original video.

Currently the distribution of data increasingly relies on peer-to-peer networks due to their low-cost installation, due to the presence of very numerous computers connected to the network, and also due to the development of broadband connections.

However, peer-to-peer networks are unstable. This is because client devices (and consequently server devices) connect and disconnect periodically to the network, thus rendering the presence of data highly unpredictable. Furthermore, the addresses of client and/or server devices are unpredictable and liable to be different at each connection.

The result of this is that access to content on a communication network of peer-to-peer type still constitutes a considerable difficulty since the lag in obtaining the data item is no longer simply due to the time necessary for retrieval of the data as in the conventional client-server topology, but also in the time for searching for a server device having that data item. According to the topology of the peer-to-peer network concerned, this searching phase may or may not be negligible.

To remedy these drawbacks, one solution consists of using a central server which guarantees a minimum quality of service. This then referred to as a hybrid peer-to-peer network.

In practice, sharing a digital document over a peer-to-peer communication network consists of the following known succession of steps:
 selecting the document to share;
 associating a unique identifier making it possible to find the location of the document on the network;
 calculating a thumbnail on the basis of the original data item;
 updating an index table at the central server by associating an identifier of the shared document with one (or several) station(s), each of these stations being server for the document.

This known succession of steps is used in most peer-to-peer networks to share a document with a community of users, that is to say that anyone may access the shared document provided that person knows the identifier. This is then referred to as public sharing.

By contrast, it is possible to share a document with a group of friends and to restrict the access to that document to that group of friends. This then referred to as restricted access sharing (private sharing).

In this case, the private sharing of a document necessitates two additional steps:
 selecting the recipients;
 sending notification to each of those recipients so as to inform them that a new document has been shared.

In practice, the present invention is in no way modified whether one or the other of these sharing systems is used. In what follows, the present invention is described in the case in which the document is publicly shared.

The stations of a peer-to-peer network are in general computers connected to the network through the wired network. Nevertheless, any type of apparatus may connect to that network. For example, a mobile telephone or a personal digital assistant. According to their capacities (memory, calculation capacity) it is possible for these apparatuses not to play their role of servers (for example mobile telephones). These cases are referred to as thin stations which only provide the client function of a station, that is to say a passive role which consists of looking at the documents or digital data which are sent to them and of sharing but however not serving the data.

One of the problems to be solved is thus to share digital documents from any digital apparatus, whether that apparatus be a station in its own right, or a thin station.

The sharing mechanism of the prior art, described above, implies that the station from which the sharing arises plays the role of server. In the opposite case, that is to say when the sharing arises from a thin station, only the thumbnail is actually shared, the original data item being stored on the thin station which cannot serve it. In fact, that original data item is accessible once it has been stored on a station in its own right, playing the role of server.

The problem to solve can thus be described by means of the following example:

Further to some photographs having been taken, a user wishes to share them (or some of them) from a thin station (typically a mobile telephone). When another user requests the original data item via the document identifier, that original data item is not accessible via the sharing system.

If we now have the photograph taker making that original data item accessible from another station (different from the thin station with which he shared the thumbnail), the problem is thus to match the original data item with the thumbnail (allocation of the same identifier) such that the station which stores that original data item can serve a request comprising that identifier.

In other words, the problem is to synchronize the two versions of different resolution (referred to here as first and second data items of a first document) of a digital document when the two versions are shared at different times or from different stations (referred to here as first and second documents).

Once a document has been shared, that is to say that the thumbnail and the original data item are associated with a unique identifier, any user may access the original data item on the basis of that identifier. This implies that the identifier is associated with the thumbnail before the thumbnail has been retrieved by another user. If this is not the case, the search mechanism described earlier cannot be used since the identifier is not known to the station which sends out the request.

For example two users exchange a thumbnail of a digital document without the identifier being attributed to that thumbnail. In this example, the sending user takes a photograph with a digital camera and sends a thumbnail of that photograph to the camera of the receiving user via a short-range radio link for example. As a variant, the photograph is sent at the original resolution, but the camera of the receiving user cannot store that photograph due to a lack of memory space. At that time, the receiving apparatus generates a thumbnail on the basis of the original image received. It may be noted that the thumbnail of the receiving user may be different from that generated by the camera of the sending user since the sub-sampling processes are not necessarily the same. The same type of scenario can also be imagined on the basis of mobile telephones or any other digital apparatus, including in particular microcomputers (sending out of the thumbnail by email). Similarly, the data (original and thumbnail) may be taken from apparatuses which cannot be equated to stations of a peer-to-peer communication network since they do not have sufficient storage capacities and/or cannot remain continuously connected to the network. Thus the invention is used when the sending user downloads the original data and the thumbnail onto a station and the receiving user downloads the thumbnail onto another station of the network.

The problem to solve thus consists of associating a unique identifier with the thumbnail (first data item of a first digital document) and the original digital data (second data item of the first digital document) stored on the station of the sending user and to associate that same identifier with the thumbnail (first data item of a second document) stored on the station of the receiving user. That receiving user can thus access all the versions of the digital document on the basis of that identifier, according to the search mechanism conventionally used in peer-to-peer sharing systems.

In other words, the problem consists of synchronizing the two documents (different resolutions and different sources) of the same digital document, that is to say that the same unique identifier is to be attributed to them as soon as those documents are accessible.

Several systems currently exist which describe synchronization of digital documents in the context of collaborative editing. These systems enable editing of a document to be performed remotely, the system synchronizing the different modifications made to the document.

The problem is nevertheless different in the case of sharing a multi-resolution document since the versions of the data are no longer modified once shared and the user receives the new version only when he has requested it.

For example, U.S. Pat. No. 5,949,551 describes a system for high quality printing of multi-resolution documents. Further to sending an image on paper by post, the system digitizes the image so as to create an original digital version of the image and a version at lower resolution (thumbnail). Next, the thumbnail is sent to the client or to an intermediary machine. The client may retrieve that thumbnail from that intermediary if he specified this at the time of making his order from the printing service. The system next calculates a time limit at the end of which the image at full resolution must be sent to the client. This time depends on several parameters: time limit imposed by the client, the resource of the communication network. During this period, the full resolution image is sent by a second means of communication, different from the first means used for sending the thumbnail. If sending was not possible within the given time, the system detects the problem and reports an item of information to the client.

This system does not require synchronization of the two image versions which are generated by the same machine. This is because the same identifier is associated with the thumbnail and the original data item from the time of their creation. This identifier is sent to the client or to the intermediary machine at the same time as the thumbnail. This identifier makes it possible to access the original image which is available from the machine which generated that image. Thus the client has knowledge of that machine as soon as he receives the thumbnail and the identifier.

SUMMARY OF THE INVENTION

The present invention provides a solution precisely to this problem of synchronization in which the client does not know the machine enabling the document to be accessed, nor the identifier of the document to share.

It relates to a digital document system in which a digital document in a communication network is shared between a plurality of stations, said system comprising:
  a first station having a first digital document comprising a thumbnail data item and an original data item;
  a second station having a second digital document comprising a thumbnail data item; and
  a center station comprising:
    calculating means for calculating signatures of the thumbnail data items of the first and second digital documents;
    comparing means for comparing the calculated signatures of the thumbnail data items; and
    transmitting means for transmitting information for accessing the original data item of the first digital document to the second station according to a result of the comparison.

The present invention also relates to a method of controlling a center station capable of communicating with a plurality of stations sharing a digital document in a communication network, characterized in that it comprises the following steps:
  a) receiving a thumbnail data item comprised in a first station and a thumbnail data item comprised in a second station;
  b) calculating a signature from each of the received thumbnail data items;
  c) comparing the calculated signatures of the received thumbnail data items, and
  d) transmitting information for accessing an original data item related to the thumbnail data item to the second station according to a result of the comparison.

According to one embodiment, the thumbnail data item comprised in the second station is generated in the first station.

According to another embodiment, color histograms each based on the thumbnail data items is calculated as the signatures in said calculating step.

For example, a comparison is performed based on a difference and a threshold calculated from the thumbnail data items in said comparing step.

In practise, said communication network is a peer-to-peer network.

For example, the first station is a digital camera apparatus and generates the original data item.

The present invention also relates to a method of controlling a station capable of sharing a digital document in a communication network, characterized in that it comprises the following steps:

i) generating an original data item;
ii) generating a thumbnail data item from the original data item;
iii) transmitting the thumbnail data item to the other station; and
iv) receiving an access from said other station to the original data item based on the thumbnail data item.

The present invention also relates to a method of controlling a station capable of sharing a digital document in a communication network, characterized in that it comprises the following steps:

1) receiving a thumbnail data item from other station;
2) transmitting the received thumbnail data item to a center station;
3) receiving, from the center station, information for accessing the original data item related to the thumbnail data item determined based on the thumbnail data item.

The present invention also relates to a device for accessing a digital document on a communication network, characterized in that it comprises means adapted to implement a method as described above.

The present invention relates to a computer program stored on an information carrier, said program comprising instructions enabling the implementation of a processing method as described above, when this program is loaded and run by a computer system.

BRIEF DESCRIPTION OF THE DRAWINGS

Other features and advantages of the invention will appear in the light of the following detailed description and drawings in which:

FIG. 3B is a diagram of the organization of the information stored on the central server according to the second embodiment;

FIG. 5 shows block diagrams illustrating the organization of the data stored in tables of a user station;

DETAILED DESCRIPTION OF THE INVENTION

Figure 1A:
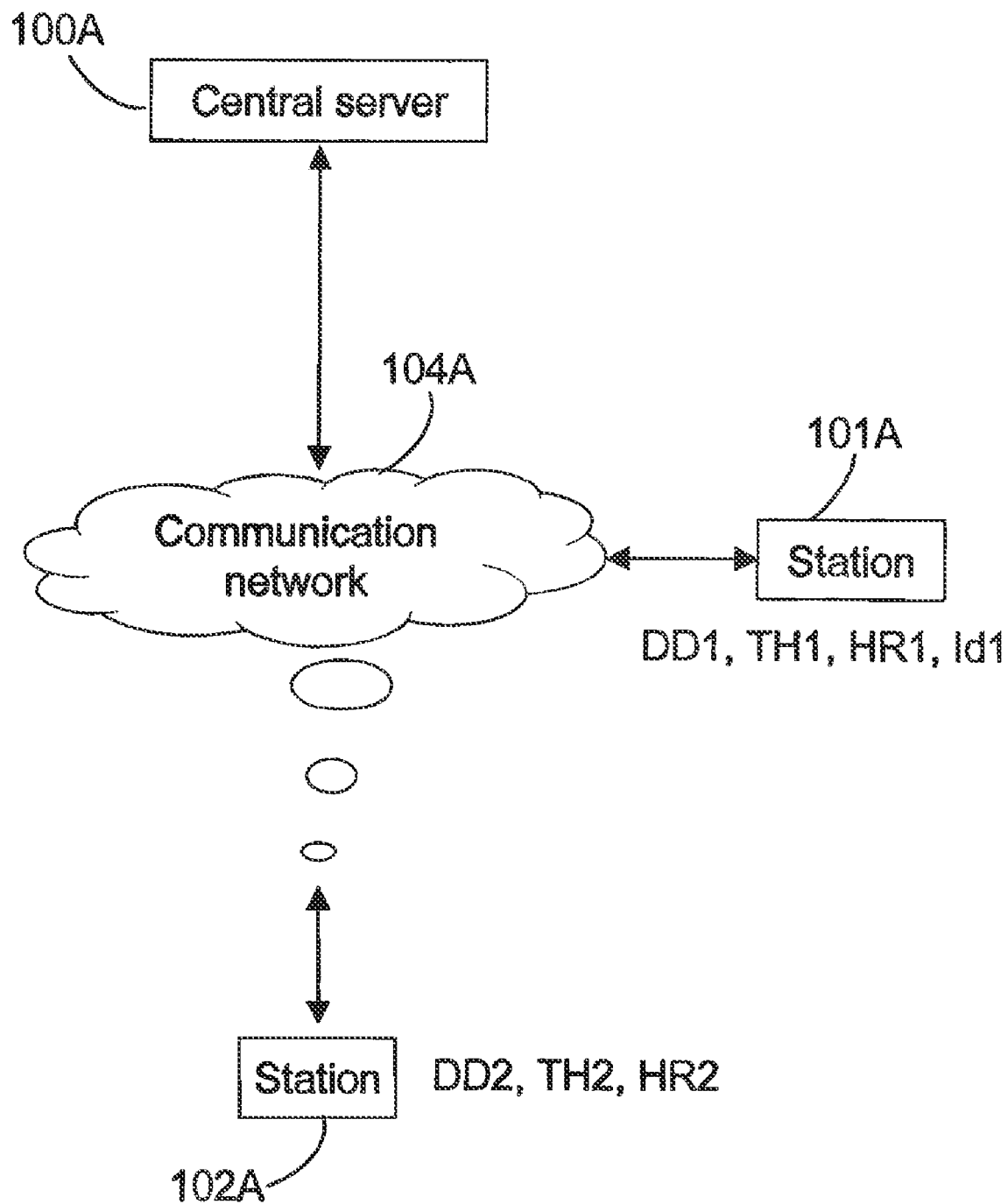
FIG. 1A shows the general architecture of a system for sharing digital documents according to a first embodiment.

With reference to FIG. 1A, the general architecture of a system for sharing digital documents implementing the invention is composed of a central server 100A and two stations 101A and 102A. These different entities are connected to each other by a communication network 104A such as the Internet.

The invention concerns a mechanism for searching for a digital document DD to share. For this, an index table, which makes it possible to access a shared document on the basis of its identifier Id, is advantageously used. This index table may be distributed or centralized. The preferred embodiment for implementation of the invention will be described on the basis of a search mechanism using a centralized table and stored on a central server.

Moreover, as explained earlier, the invention described here assumes that the original data item HR and a thumbnail TH are stored on a first station 101A and that another thumbnail TH2 calculated on the basis of the original data item HR2 is stored on a second station 102A.

It will also become apparent in what follows that the matching mechanism requires a systematic analysis of each entry of the index table. Such an analysis is unrealistic when the number of entries in that table becomes enormous (several thousands or even millions of entries). A variant of this algorithm consists of limiting the analysis to the entries which correspond to the data shared by the sending user or to the data served by a reference station attached to that sending user.

For this, on sending that original data item HR1 or the thumbnail TH1 to a receiving user 102A, the sending user 101A includes an item of information for it to be identified. For example, the identifier of that sending user can be hidden in the header of the data item or of the document to share.

In what follows, FIGS. 6, 7, 8 and 12A explain the operation of a conventional system for searching for shared documents on the basis of their identifiers.

Figure 2A:
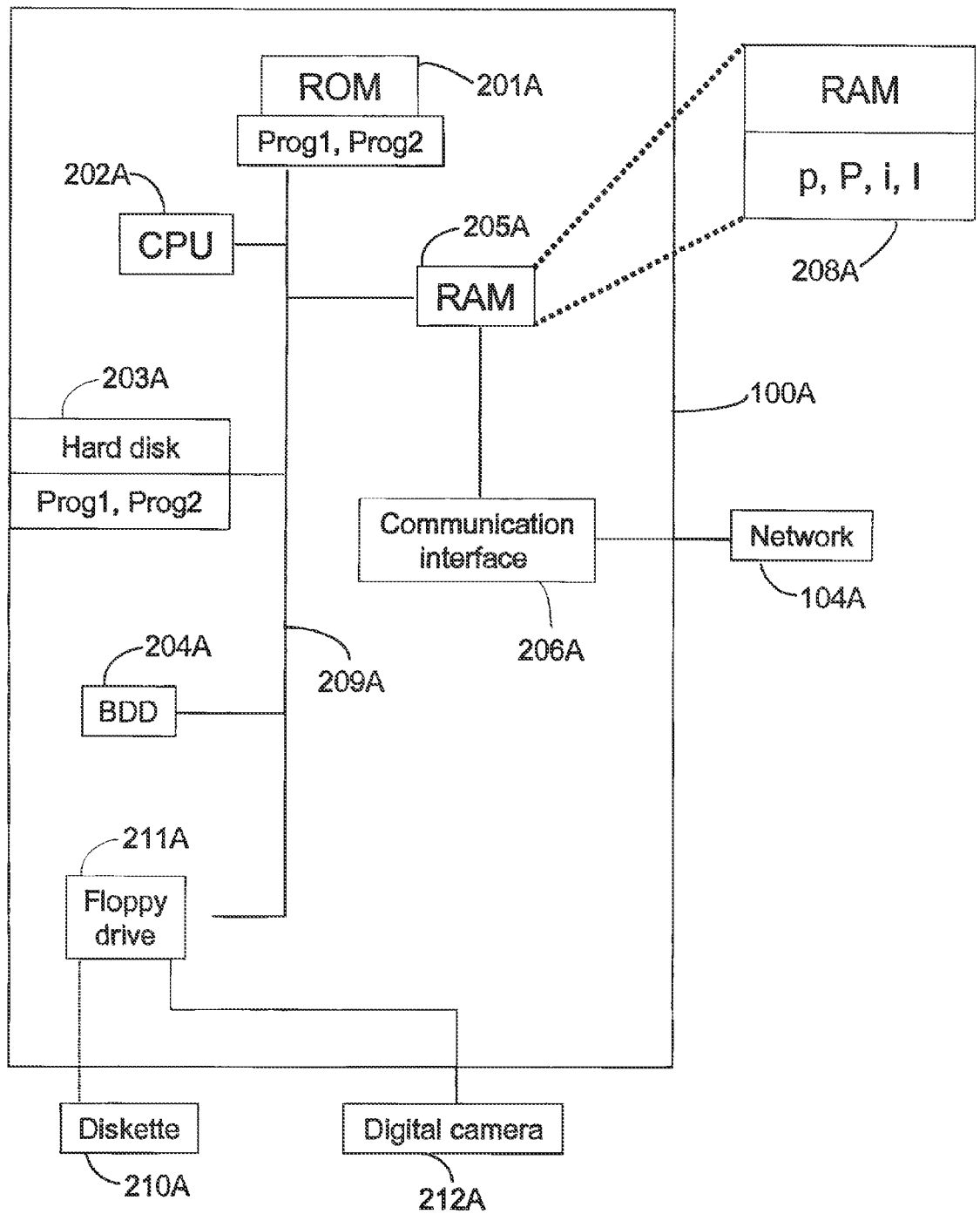
FIG. 2A shows a device implementing the part of the invention dedicated to a central server according to the first embodiment.

The role of the central server 100A is to centralize and temporarily store a certain number of items of information which will be described in more detail below. The central server 100A, which for example may be a microcomputer or a workstation, is continuously connected to the peer-to-peer network. Such a machine is described with reference to FIGS. 2A and 3A.

Stations 101A and 102A may for example be a microcomputer or a workstation. These apparatuses fully play the role of a station i.e. the role of client and of server. For this, they have sufficient memory and calculation capacities to implement the part of the invention dedicated to them.

Figure 9A:
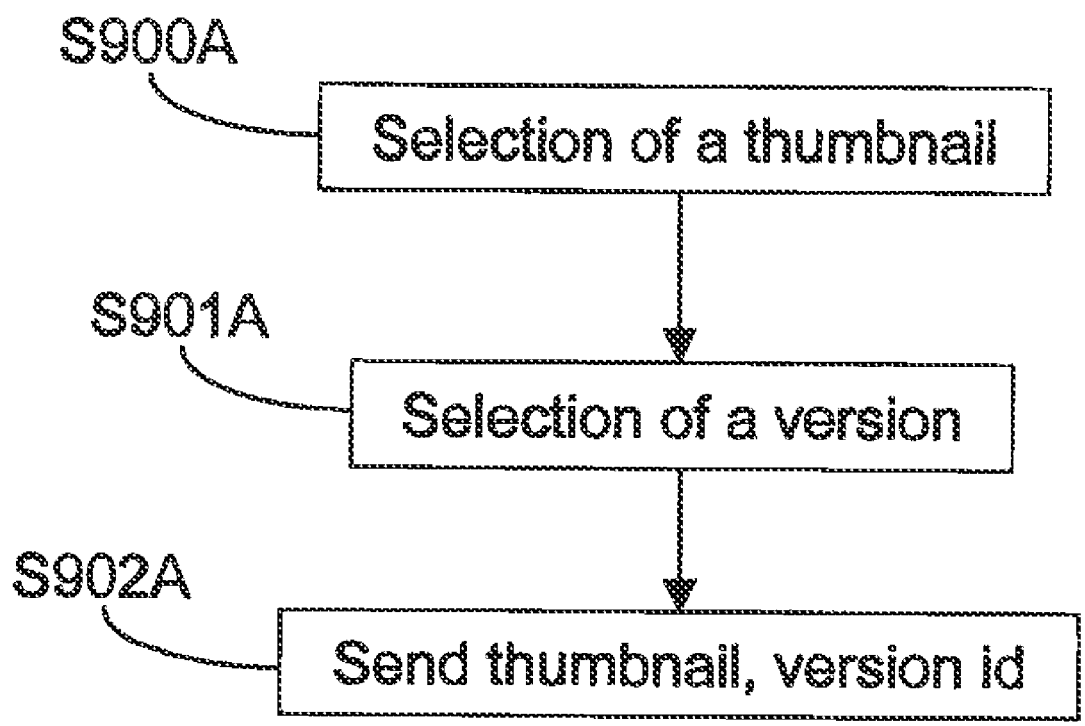
FIG. 9A shows a block diagram illustrating the creation of a request containing a thumbnail, from a user station according to the first embodiment.
Figure 10A:
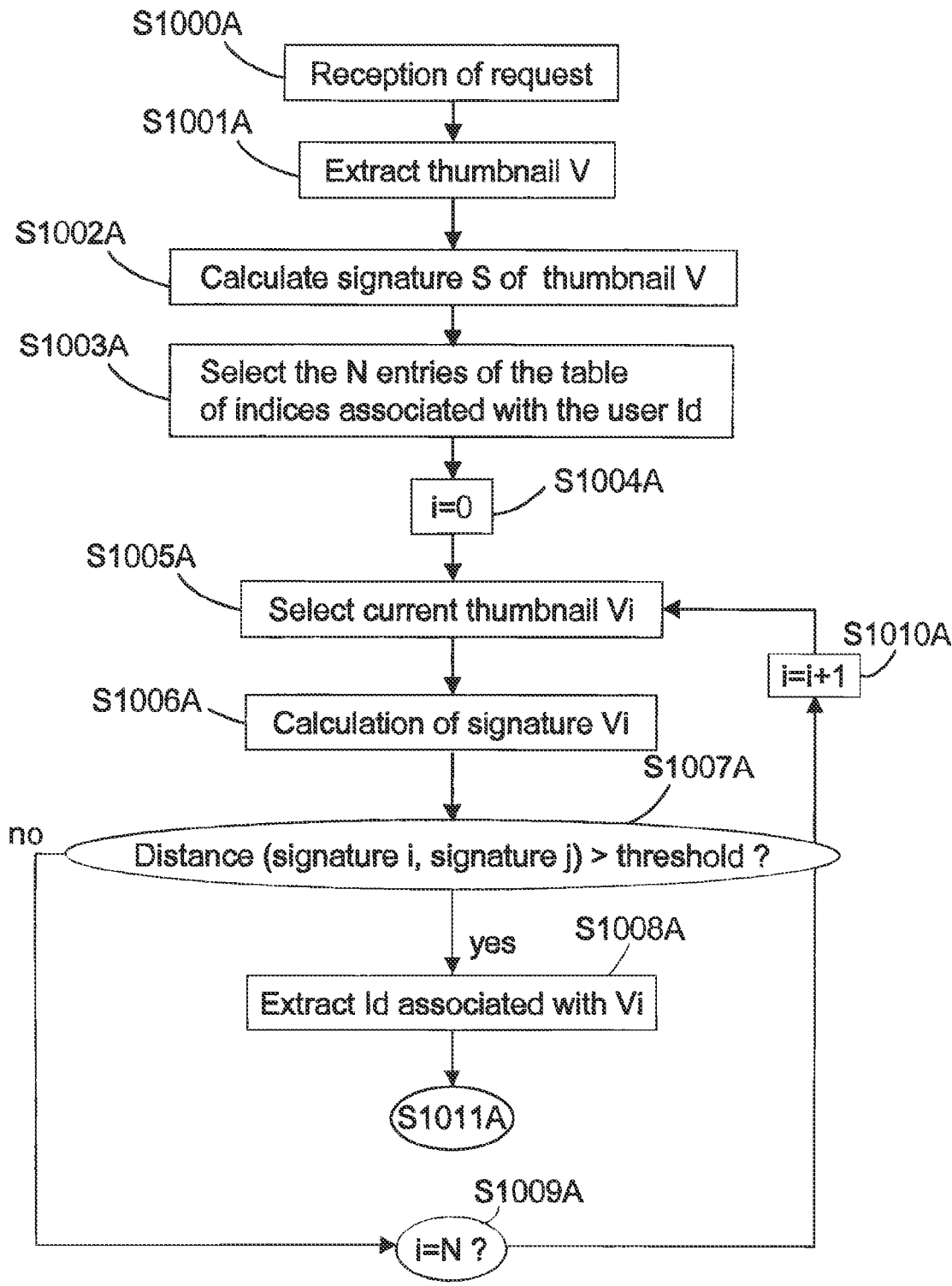
FIGS. 10A and 11A show block diagrams illustrating the mechanism of searching for a digital document on the basis of a thumbnail according to the first embodiment.
Figure 11A:
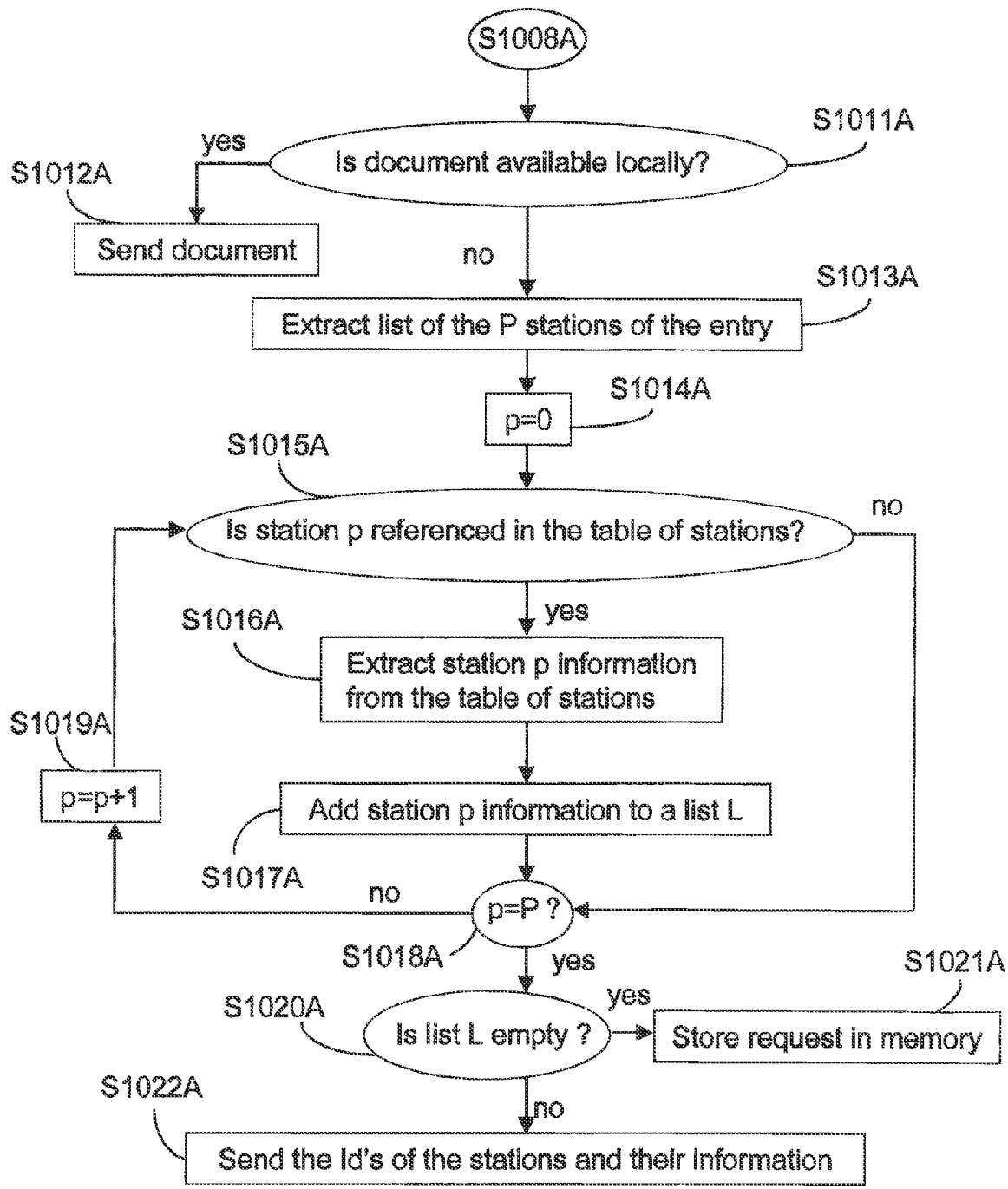

The apparatus 100A comprises a communication bus 209A to which there are connected:
- a central processing unit 202A (microprocessor) which controls the exchanges between the various components of the apparatus,
- a read only memory 201A, able to contain the programs,
- a random access memory 205A comprising registers 208A adapted to store variables and parameters created and modified during the execution of the programs, with reference to FIGS. 9A, 10A and 11A.
- a hard disk 203A able to contain the aforementioned programs,
- a disk drive 211A adapted to receive a diskette 210A and to read or write thereon data processed or to be processed according to the invention,
- a communication interface 206A connected to a communication network 104A, for example the Internet, the interface being able to transmit and receive data.

The communication bus affords communication and interoperability between the different elements included in the apparatus 100A or connected to it. The representation of the bus is non-limiting and, in particular, the central processing unit is capable of communicating instructions to any element of the apparatus 100A directly or by means of another element of the apparatus 100A.

The executable code of each program enabling the programmable apparatus to implement the methods according to the invention may be stored, for example, on the hard disk 203A or in read only memory 201A.

According to a variant, the diskette 210A can contain data as well as the executable code of the aforementioned programs which, once read by the apparatus 100A, are stored on the hard disk 203A.

As a second variant, the executable code of the programs can be received by the intermediary of the communication network 104A, via the interface 206A, in order to be stored in an identical fashion to that described previously.

The diskettes can be replaced by any information carrier such as a compact disc (CD-ROM) or a memory card. Generally, an information storage means, which can be read by a computer or microprocessor, integrated or not into the apparatus, and which may possibly be removable, is adapted to store one or more programs whose execution permits the implementation of the method according to the invention.

More generally, the program or programs may be loaded into one of the storage means of the apparatus 100A before being executed.

The central processing unit 202A controls and directs the execution of the instructions or portions of software code of the program or programs according to the invention, the instructions being stored on the hard disk 203A or the read only memory 201A or in the other aforementioned storage elements. On powering up, the program or programs which are stored in a non-volatile memory, for example the hard disk 203A or the ROM 201A, are transferred into the RAM 205A, which then contains the executable code of the program or programs according to the invention, as well as registers for storing the variables and parameters necessary for implementation of the invention.

It should be noted that the communication apparatus comprising the device according to the invention can also be a programmed apparatus.

This apparatus then contains the code of the computer program or programs, for example fixed in an application specific integrated circuit (ASIC).

Figure 3A:
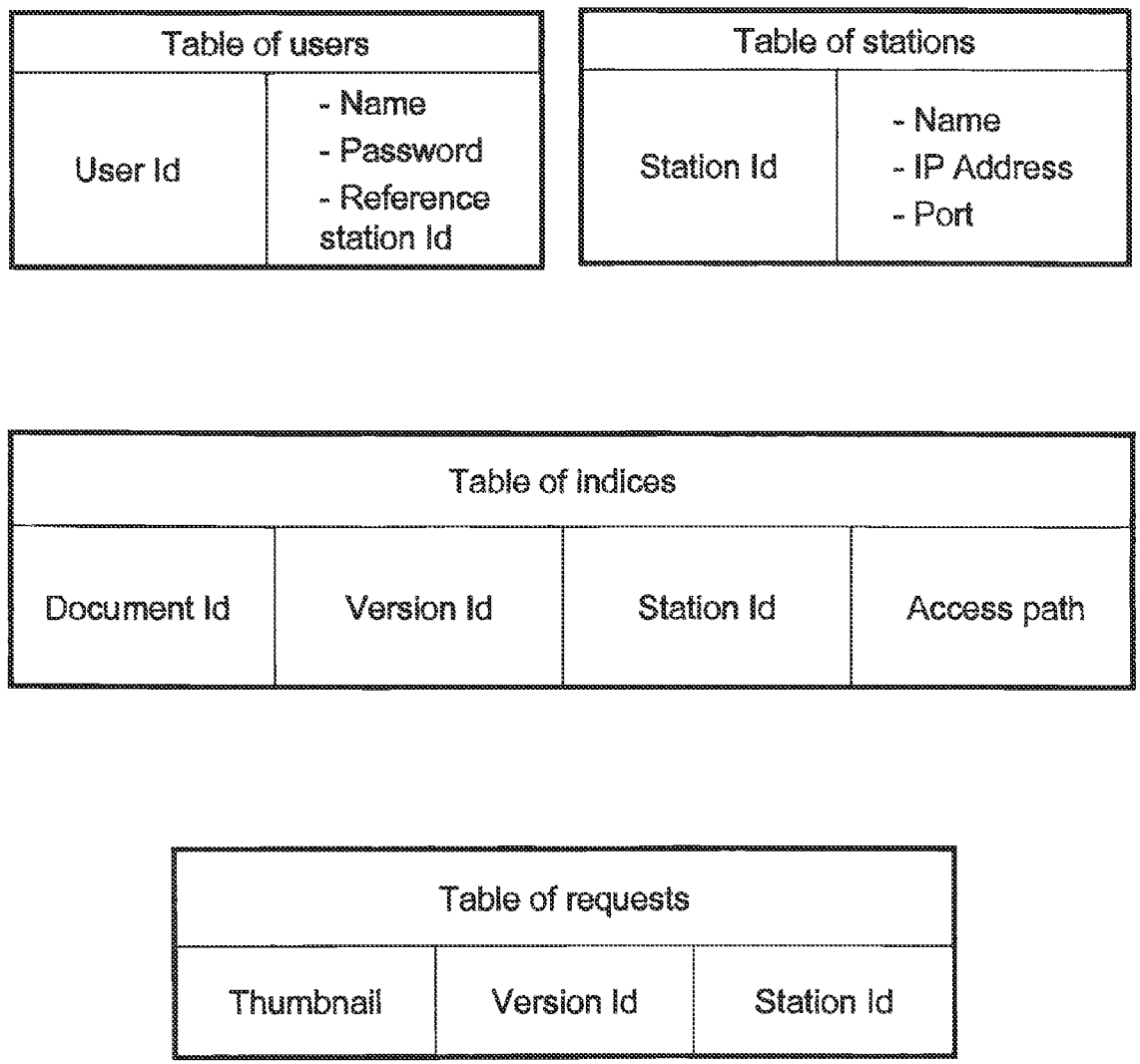
FIG. 3A shows block diagrams illustrating the information stored in tables of the central server according to the first embodiment.

With reference to FIG. 3A, the organization of the information stored on the central server 100A is described.

According to a preferred embodiment of the invention, the information concerning the shared documents or data, the requests awaiting response, and the information on the users and the stations will be centralized on the central server 100A. Nevertheless, the invention may be applied to a system which distributes this information (or part of it) to the stations 102A or others (reference station not shown).

The information stored on the central server is grouped into a look-up table, for example subdivided into four tables: a table of the users, a table of the stations, a table of the indices and a table of the requests.

Any user who wishes to share a document or data item is preferably registered with the central server for this, the user connects to the central server via a Web service or via a graphical application dedicated to the sharing system.

According to a preferred embodiment, the Web interface is used. The central server sends a form which the user fills in using a login name and a password.

According to a variant, during this procedure, the central server registers the station from which the user is connected, as being its reference station.

Of course, the user may access this registration information so as to modify, for example, its reference station. All this information is stored in the table of users. Furthermore the central server associates a unique identifier with the newly registered user.

The table of stations (IP address, etc.) contains the information making it possible to connect to the station on the basis of its identifier. This table is updated at each connection or disconnection of a registered station. This status of connection or disconnection is, among other things, one of the key conditions which serve to determine whether a data item may be served or not.

The index table is empty when the system starts up. This table comprises an entry composed of four fields for each version of a document to share:
- the unique identifier of the shared document,
- the identifier of the version (first or second data item) of the shared document,
- a list of identifiers of stations which serve the version of the document,
- a local access path for the case in which the version of the document is stored on the central server.

Two identifiers are associated with each shared document: one, unique, to identify the document, and another to identify the version of that document (original version, thumbnail, etc.). The list of stations which serve a remote document is stored as well as the local path for access to that data item.

It should be noted that this index table is updated as soon as a new thumbnail is shared, as soon as a station no longer serves a version of a document and as soon as a station has just retrieved a new version of a shared document.

This centralized index table makes it possible to implement the conventional search mechanism in a peer-to-peer network described with reference to FIGS. 6, 7 and 8.

The table of requests temporarily stores the requests which cannot be served. The thumbnail, the identifier of the version of the document which is searched for and the identifier of the station which sent the request are stored in that table of requests.

Figure 4A:
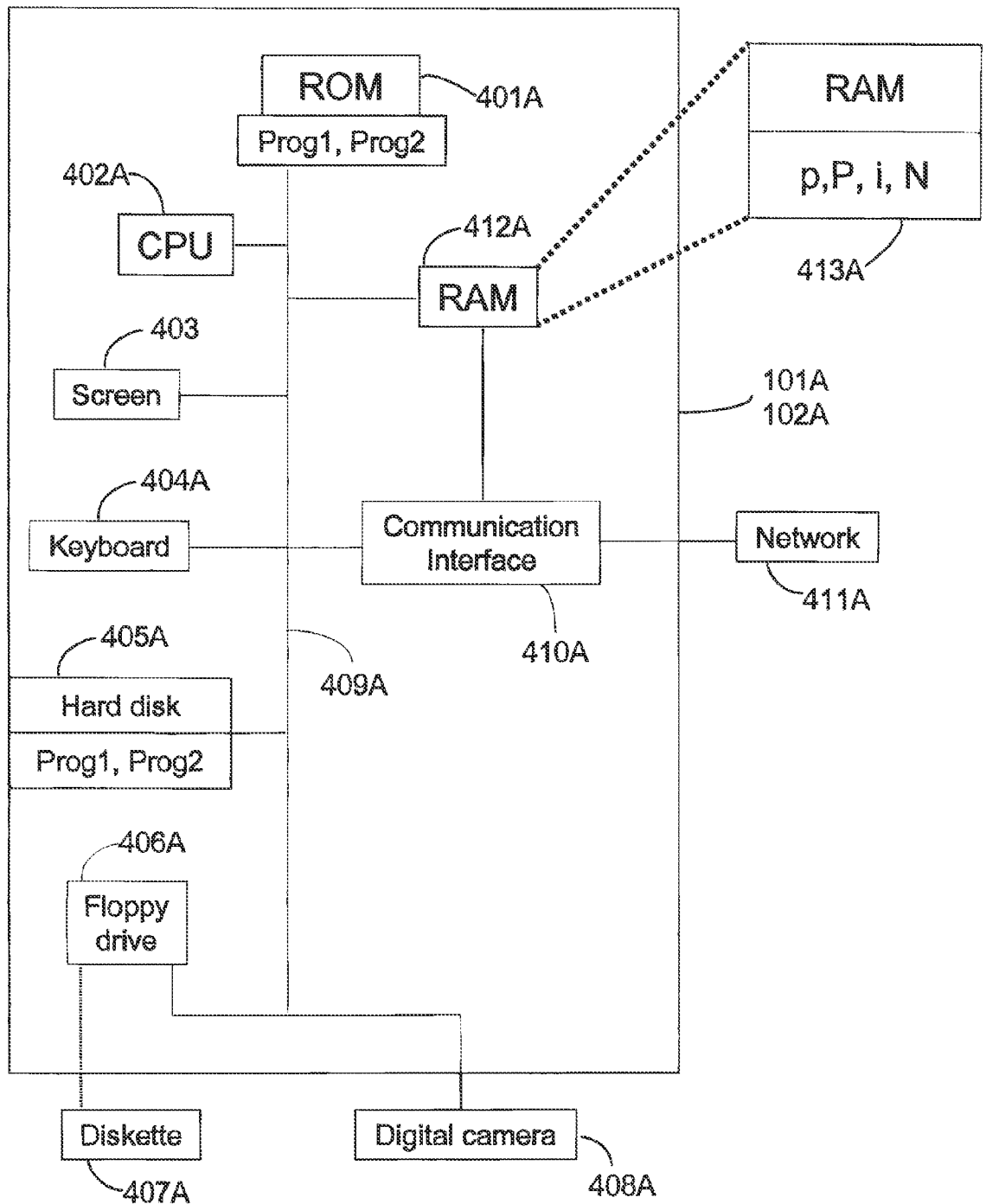
FIG. 4A shows a device implementing the part of the invention dedicated to a user station according to the first embodiment.

With reference to FIG. 4A, a programmable apparatus implementing the part of the invention dedicated to the stations 101A and 102A is described. This part of the invention is described with reference to FIG. 9A.

Apparatuses 101A and 102A comprise a communication bus 409A to which there are connected:
- a central processing unit 402A (microprocessor) which controls the exchanges between the various components of the apparatus,
- a read only memory 401A, able to contain the programs,
- a random access memory 412A comprising registers 413A adapted to store variables and parameters created and modified during the execution of the programs, with reference to FIGS. 9A, 10A and 11A.
- a screen 403A for displaying data and/or serving as a graphical interface with the user, who will be able to interact with the programs according to the invention, using a keyboard 404A or any other means such as a pointing device (not shown), for example a mouse or an optical stylus,
- a hard disk 405A able to contain the aforementioned programs,
- a disk drive 406A adapted to receive a diskette 407A and to read or write thereon data processed or to be processed according to the invention,
- a communication interface 410A connected to a communication network 411A, for example the Internet, the interface being able to transmit and receive data.

The communication bus allows communication and interoperability between the different elements included in the microcomputer 101A, 102A or connected to it. The representation of the bus is non-limiting and, in particular, the central processing unit is able to communicate instructions to any element of the microcomputer 101A, 102A directly or by means of another element of that microcomputer.

The executable code of each program enabling the programmable apparatus to implement the processes according to the invention may be stored, for example, on the hard disk 405A or in read only memory 401A.

According to a variant, the diskette 407A can contain data as well as the executable code of the aforementioned programs which, once read by the apparatus 101A, 102A, are stored on the hard disk 405A.

As a second variant, the executable code of the programs can be received by the intermediary of the communication network 411A, via the interface 410A, in order to be stored in an identical fashion to that described previously.

The diskettes can be replaced by any information carrier such as a compact disc (CD-ROM) or a memory card. Generally, an information storage means, which can be read by a computer or microprocessor, integrated or not into the apparatus, and which may possibly be removable, is adapted to store one or more programs whose execution permits the implementation of the method according to the invention.

More generally, the program or programs may be loaded into one of the storage means of the apparatus 101A, 102A before being executed.

The central processing unit 402A controls and directs the execution of the instructions or portions of software code of the program or programs according to the invention, the instructions being stored on the hard disk 405A or the read only memory 401A or in the other aforementioned storage elements. On powering up, the program or programs which are stored in a non-volatile memory, for example the hard disk 405A or the ROM memory 401A, are transferred into the random access memory RAM 412A, which then contains the executable code of the program or programs according to the invention, as well as registers for storing the variables and parameters necessary for implementation of the invention.

It should be noted that the communication apparatus comprising the device according to the invention can also be a programmed apparatus. This apparatus then contains the code of the computer program or programs for example fixed in an application specific integrated circuit (ASIC).

With reference to FIG. 5, the organization of the information stored on the stations 101A and 102A has been described.

The documents table enables a version of a document stored on the station to be accessed on the basis of the version and document identifiers. This table is used when the station receives a request in which those identifiers are specified. The response to a request is described with reference to FIG. 8.

The thumbnails table makes it possible to retrieve the version and document identifiers locally on the basis of a selection made by the user via a graphical interface. This process is described with reference to FIG. 6.

Figure 6:
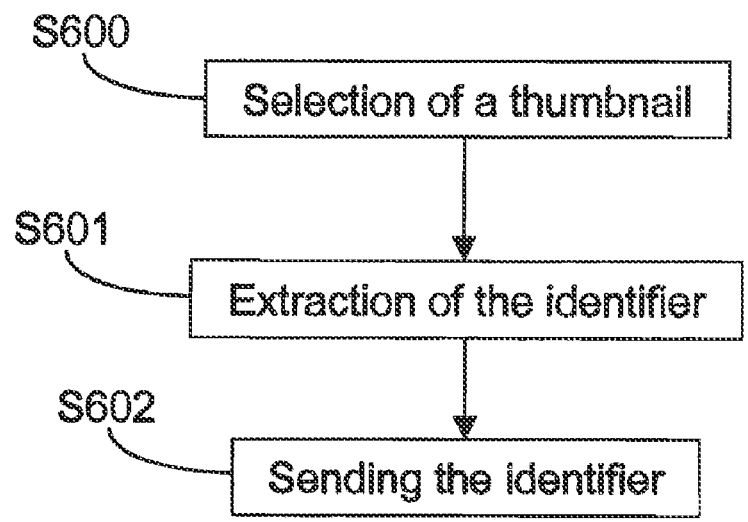
FIG. 6 shows a block diagram illustrating the creation of a request containing an identifier, from a user station.

With reference to FIG. 6, the method is described which makes it possible to request a version of a shared document.

The method commences with step S600 during which a user selects the document to retrieve, for example an image. For example, that selection may be made via a graphical interface which displays a set of thumbnails on the screen of the station. Each of these thumbnails corresponds to a shared document. The user selects one of these thumbnails and specifies the version of the document which he wishes to retrieve. The process interprets this information and generates a string of characters which uniquely identifies the version of that document in the table of thumbnails.

At step S601, the method retrieves the identifiers corresponding to that string and sends them to the central server (S602).

Figure 7:
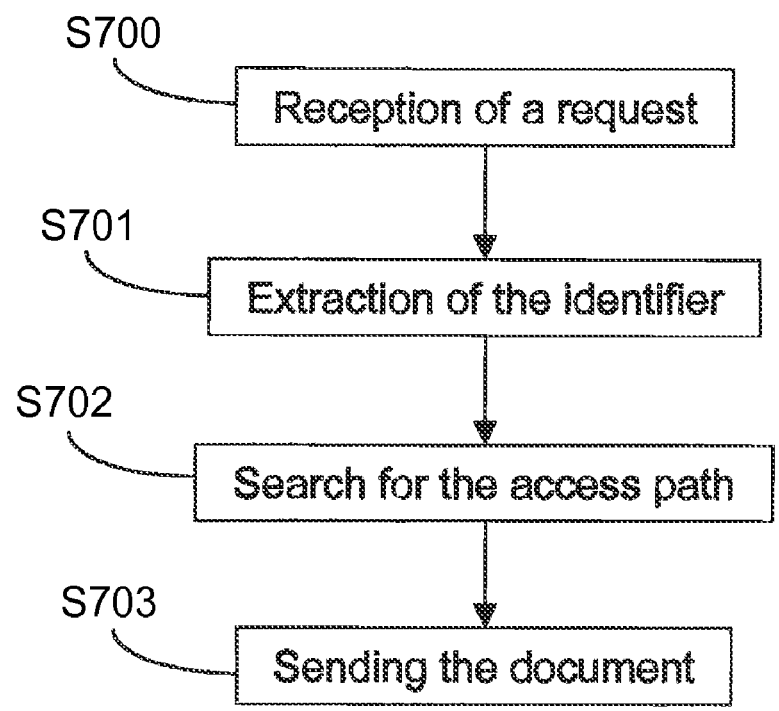
FIG. 7 shows a block diagram illustrating the delivery of a document by a user station according to an identifier.

With reference to FIG. 7, the method is described that makes it possible for a station to serve a version of a document. Further to a request sent by a requesting station (S700), the process extracts the identifiers (S701) of that request and extracts the access path of the table of data (S703). Step S704 consists of sending the data to the requesting station.

Figure 8:
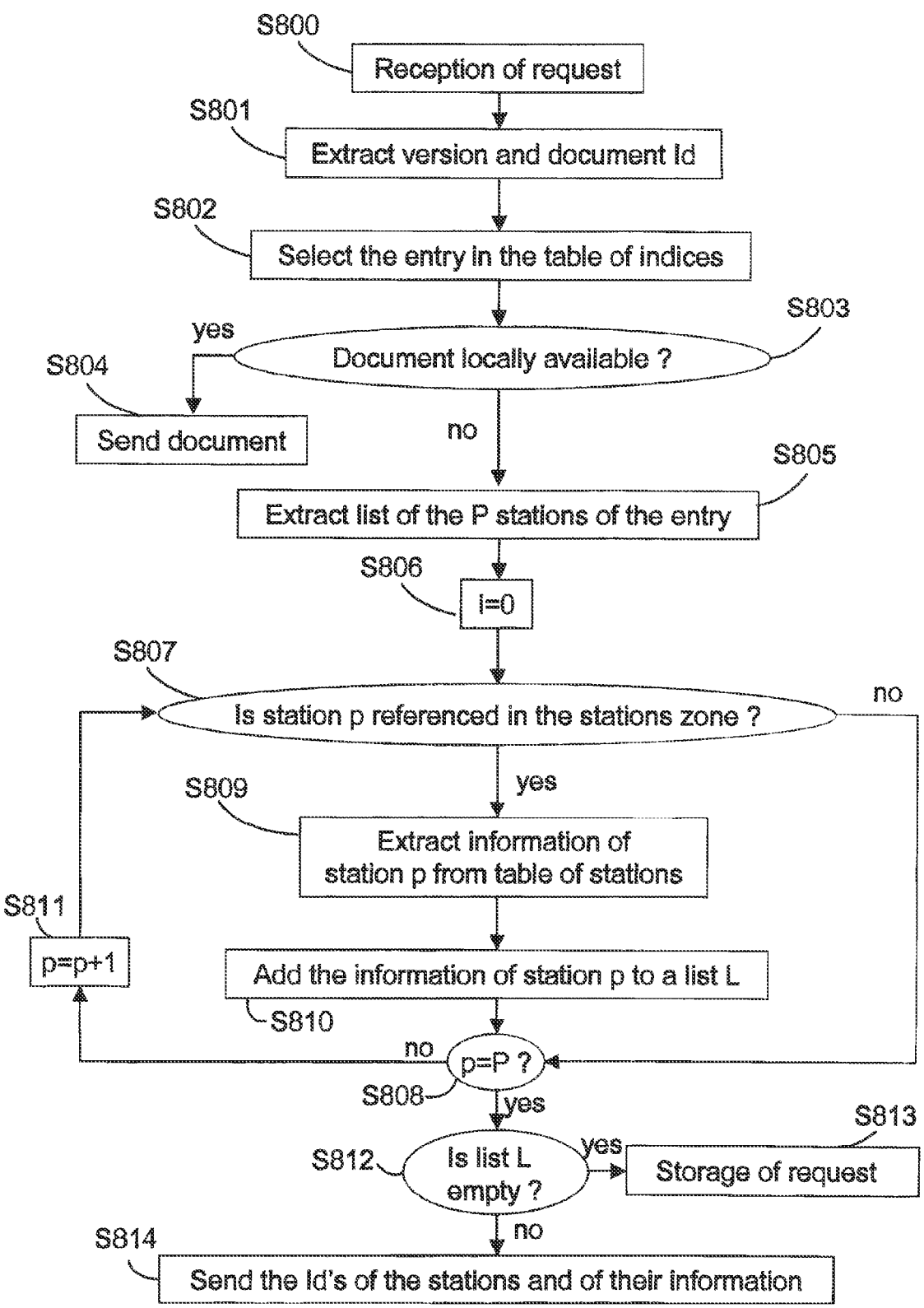
FIG. 8 shows a block diagram illustrating the mechanism of searching for a digital document on the basis of an identifier.

With reference to FIG. 8, the mechanism of searching for a digital document is described. The method commences further to a request sent by a user from a station (S602). This request is composed of two identifiers defining the version of the data sought and the identifier of the station which sent the request (so as to be able to send the response to that station).

On reception of that request (S800), the central server extracts the identifiers of the document to share (S801) and searches for the entry of the index table which corresponds to those two identifiers (S802). Where this document is available locally ("access path" field filled in) (S803), the central server sends the document to the station (S804) and the method stops. In the opposite case, the list of the identifiers of the stations is extracted from the entry of the index table (S805). Next, the method retrieves the connection information of each of those stations from the table of stations (S806-S809). It may be recalled that all the stations referenced in that table are connected to the network. As soon as one of them disconnects, it informs the central server which updates the table. The same applies for any new connection or as soon as the connection information of a station changes. This station information is temporarily stored in a list L (S810). If that list is empty (no station connected) (S812), the request is placed on standby until one of them connects (S813). In the opposite case, the central server sends the list L to the requesting station (S814).

When the station which sent the request receives the response, a process analyzes whether the response contains the requested document. If this is the case the search method terminates. If this is not the case, the station sends the request to each of the stations in turn of the list L extracted on the basis of the response.

The method stops when one of the stations serves the requested document.

With reference to FIG. 9A, the process is described which makes it possible to request a version of a document to share. Note that at that time, the requesting station does not possess the identifier Id1 of the document to share DD1, HR1 but only the thumbnail TH2 of that document to share and the identifier of the user who provided him with that thumbnail TH2.

The method commences with step S900A during which a user selects the thumbnail TH2 to retrieve. For example, that selection may be made via a graphical interface which displays a set of thumbnails on the screen of the station. Each of these thumbnails TH corresponds to a shared document DD. The user selects one of these thumbnails and specifies the version of the document which he wishes to retrieve (S901A). Step S902A sends those thumbnails TH2 and the version identifiers to a station capable of serving it, for example, to the central server.

With reference to FIGS. 10A and 11A, the method is described which enables a station to find the identifier Id1 of the requested document DD1 on the basis of its thumbnail TH1. According to a preferred embodiment, this station is the central server. Nevertheless, the different methods described below constituting the method may be executed on different stations, for example station 101A.

Further to a request sent out by a requesting station (S1000A), the process extracts the thumbnail TH2, the version identifier of the requested document and the user identifier (S1001A) of that request (according to a preferred embodiment) and calculates a signature for that thumbnail TH2 (S1002A). According to a preferred embodiment of the invention, this signature is a colors histogram calculated on the basis of the thumbnail TH2.

Steps S1003A-S1009A describe the mechanism for matching that thumbnail TH2 with the stored thumbnails TH1 of the documents to share (referenced in the table of the indices).

Step S1003A selects the entries of the table of the indices which were generated further to sharing of data coming from the user whose identifier is the one contained in the request. Where that identifier is not present in the request, all the entries of the table are considered.

Furthermore, only the entries corresponding to the version identifier, contained in the request, are considered.

Steps S1004A-S1009A describe the mechanism for matching between the signature S of the thumbnail TH2 received and the signature coming from the thumbnails TH1 referenced by the selected entries of the table of the indices. For this, a metric is defined between two signatures. In the case of colors histograms, a distance defined in M. J. Swain, D. H. Ballard, "Color Indexing", Inter. Journal of Comp. Vision, 7:1, pp 11-32, 1991. This distance has the value 1 if both signatures are equal and 0 otherwise. If the signature S is greater than a threshold (between 0 and 1), step S1007A is followed by the step S1008A which extracts the identifier of the data item of the entry in the corresponding index table. Of course, if the entry does not exist, the request is placed on standby. As soon as a new entry is generated, the process tests whether that new entry comprises the version and user identifiers contained in the request such that the process of FIG. 10A can continue with step S1011A of FIG. 11A. This step S1011A tests whether the version of the document is available on the central server. Where this document is available locally ("access path" field filled in), the central server sends the data item to the requesting station (S1012A) and the method stops. In the opposite case, the list of the identifiers of the stations is extracted from the entry of the index table (S1013A). Next, the process retrieves the connection information of each of these stations from the table of stations (S1014A-S1019S). It may be recalled that all the stations referenced in that table are connected to the network. As soon as one of them disconnects, it informs the central server which updates the table. The same applies for any new connection or as soon as the connection information of a station changes. This station information is temporarily stored in a list L (S1017A). If that list is empty (no station connected) (S1020A), the request is placed on standby until one of them connects (S1021A). In the opposite case, the central server sends the list L to the requesting station (S1022A).

When the station which sent the request receives the response, a process analyzes whether the response contains the requested data item. If this is the case the search method terminates. If this is not the case, the station sends the request to each of the stations in turn of the list L extracted on the basis of the response. The method stops when one of the stations serves the requested document or data item.

Two variants may be added to this search mechanism. According to the first variant, the central server only sends the information concerning a sole station. According to the second variant, the central server sends an ordered list of those stations. The ordering is based on the connection capacities of those stations (bandwidth) or on the presence time of that station (connection time to the network evaluated for a period of time).

Figure 12A:
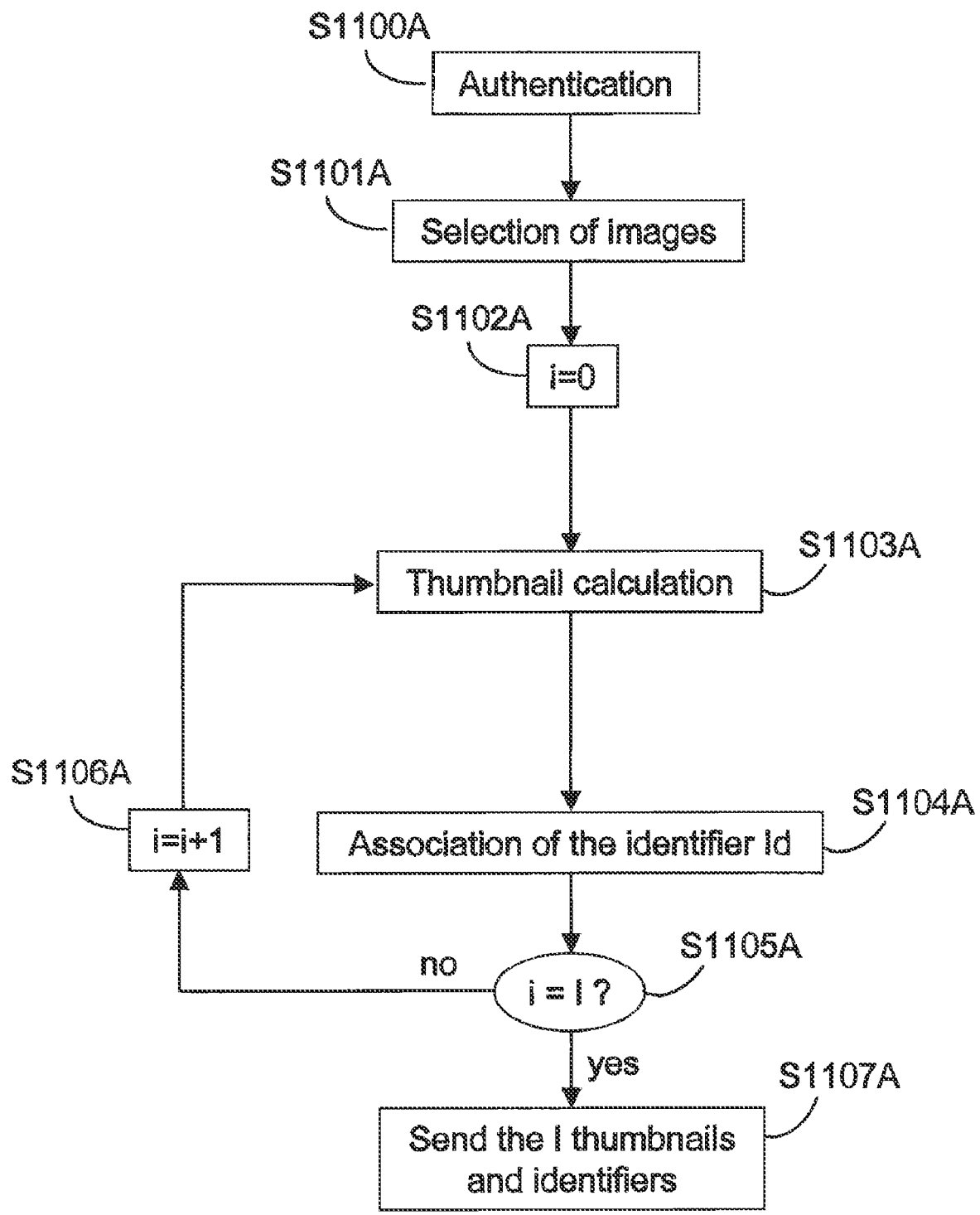
FIG. 12A shows a block diagram illustrating the mechanism for sharing a new document according to the first embodiment.

With reference to FIG. 12A, the sharing of a document from a station is described. This sharing mechanism is used in a peer-to-peer sharing system comprising (or not comprising) the invention.

The document to share is stored locally on the station. First of all, the sending user 101A is authenticated at the central server by him stating his login and password (S1100A). The sending user 101A next selects the original data item or items to share (S1101A). For each of them, the process calculates a thumbnail TH1 (S1103A). The thumbnail TH1 is stored locally. The method also associates two identifiers Id (data item and version) with each of the thumbnails TH1 (S1104A). The table of the thumbnails TH1 is updated (S1105A). Finally, a message is sent to the central server (S1107A). This message is composed of the identifiers and of the thumbnail TH1 of each of the documents DD to share.

A variant consists of sending only the thumbnail TH1 to the central server which calculates the identifiers Id. In this case, the identifiers Id are sent back the station 102A which sent out the request, once they have been generated by the central server. The station stores these identifiers in the table of the thumbnails TH.

When the central server receives the message of step S1107A, a process extracts the list of the identifiers (if they have been sent) and of the thumbnails. This step of course associates the data item and version identifiers if they have not been received. The thumbnails, their access paths and the identifiers are stored locally and the index table is updated. For this, a new entry is created for each version of the document to share. Each of these entries comprises the identifier of the document, the identifier of the version and the local access path enabling the thumbnail to be accessed if the entry corresponds to a thumbnail. If the entry corresponds to an original data item, the field is not referenced.

Figure 13A:
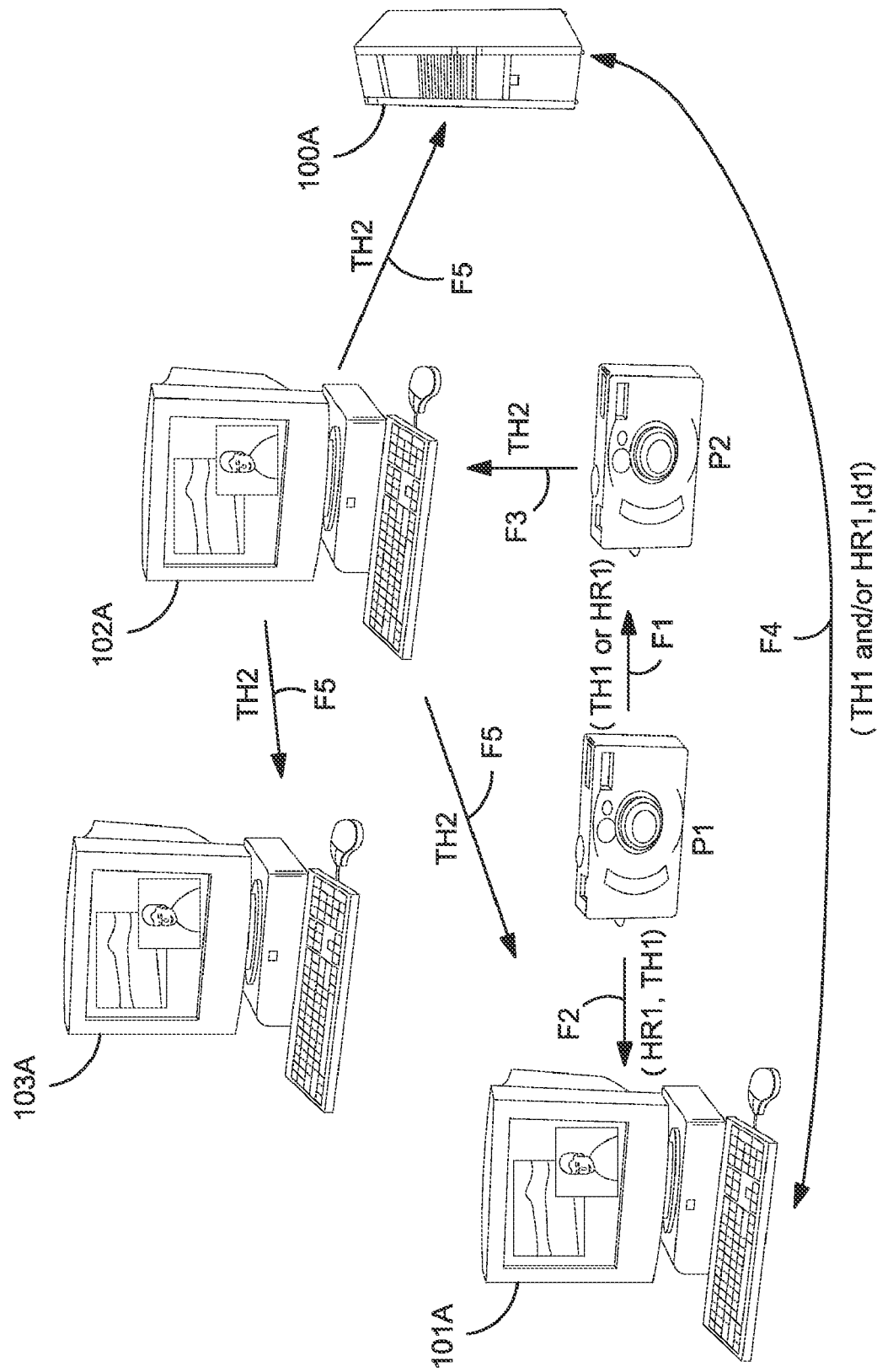
FIG. 13A illustrates the general steps of the method of sharing a digital document of photograph type in accordance with the invention according to the first embodiment.

With reference to FIGS. 1A and 13A, the general steps are described of the sharing method according to the invention.

For example, a first sending user P1 exchanges a first data item TH1 of a document DD1 with a second receiving user P2. This action is illustrated by action F1. The exchange is free and uses no function in particular. For example, the sending user P1 takes a photograph with a digital camera and sends a thumbnail TH1 of that photograph to the camera of the receiving user P2 via a short-range radio link. As a variant, the photograph is sent at the original resolution HR1, but the camera of the receiving user cannot store that photograph due to a lack of memory space. At that time, the receiving apparatus generates a thumbnail TH2 on the basis of the original image received. It may be noted that the thumbnail of the receiving user P2 may be different from that generated by the camera of the sending user P1 since the sub-sampling processes are not necessarily the same.

It may also be that the camera of the receiving user P2 accepts the original image on his camera; the latter is then saved on the camera and corresponds to what is termed a second data item HR2 of a second digital document DD2. The obtainment of the corresponding thumbnail TH2 can then be made on station 102A of the receiving user P2.

The same type of scenario can also be imagined on the basis of a mobile telephone or any other digital apparatus, including in particular microcomputers (sending out of the thumbnail by email).

In our example, the receiving user P2 wishes to access the second data item HR1 of the first document DD1 further to that exchange. The second data item HR1 is for example the original data item at full resolution of the first document DD1 whereas the first data item is a thumbnail TH1 of lower resolution, which corresponds to a first edition relationship of hierarchical type between the first and second data items of the first digital document to share according to the invention.

The sending user P1 loads onto his station 101A the first TH1 and second HR1 data items of the first digital document DD1 (action F2). The first digital document DD1 is identified by a chosen identifier Id1. This is carried out either directly by the station 101A, or further to an exchange between the station 101A and the server station 100A, as illustrated by the arrow F4.

The receiving user P2 loads onto his station 102A the data item thus exchanged which corresponds here to a first data item TH2 of a second digital document DD2 (action F3), said first and second digital documents DD1 and DD2 being linked to each other according to a second chosen temporal and geographical edition relationship.

The receiving user P2 sends out a request to the peer-to-peer communication network according to the invention to obtain the identifier Id1 of document DD1 on the basis of the first data item (thumbnail) TH2 of the second document DD2. The request is sent to at least one station capable of serving the document DD1, here at the server 100A, station 101A or else a reference station 103A designated by the sending user (action F5). The request comprises at least the second data item TH2.

At station 101, the reference station 103A or the server 100A, the second data item TH2 is received and the first data items TH1 and TH2 of the first and second digital documents so obtained are compared.

In case of positive comparison, the identifier Id1 is attributed to the second digital document DD2.

At station 102A, the second data item HR1 of the first digital document DD1 is accessed from the second digital document DD2 so identified.

Figure 1B:
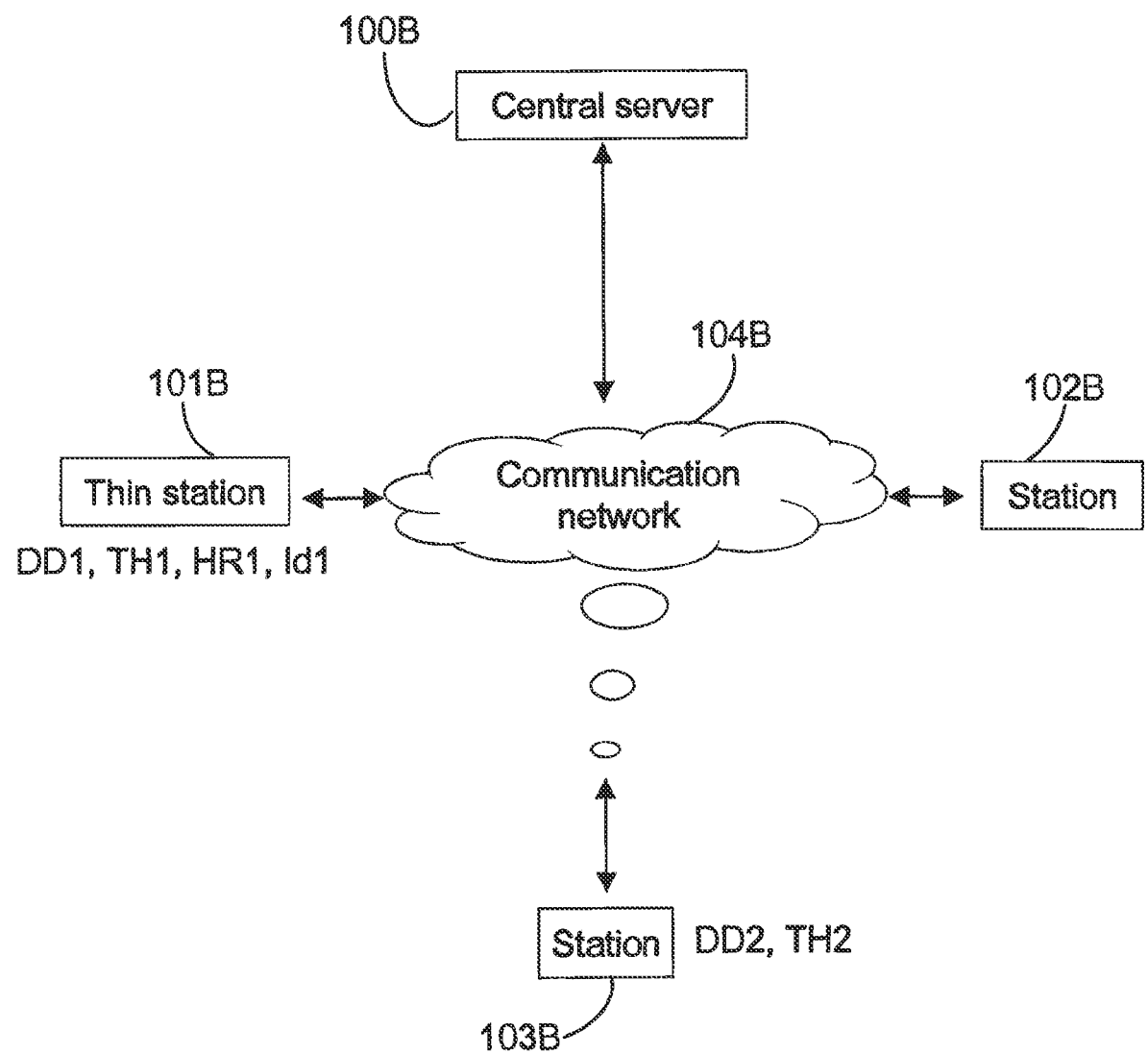
FIG. 1B is a block diagram illustrating the general architecture of a device for sharing digital data implementing the invention according to a second embodiment.

With reference to FIG. 1B, and according to a second embodiment of the present invention, a device for sharing digital data implementing the invention is composed of a central server 100B, a thin station 101B, a reference station 102B and a requesting station (this station is the one from which a user requests a data item on the basis of it identifier). These different entities are connected by a communication network 104B such as the Internet.

The described invention does not directly concern the mechanism for searching. Thus the index table which enables a shared document to be accessed on the basis of its identifier may be distributed or centralized. The preferred embodiment for implementation of the invention will be described on the basis of a search mechanism using a centralized table.

The role of the central server 100B is to centralize and temporarily store a certain number of items of information described later. This machine, which for example may be a micro-computer or a workstation, is permanently connected to the peer-to-peer network. It is described in more detail with reference to FIGS. 2B and 3B.

The thin station 101B may for example be a micro-computer, a mobile phone, a personal digital assistant PDA or any other apparatus having wired or wireless communication means. In practice, this station does not require high storage or calculation capacities.

Finally, stations 102B and 103B may for example be a microcomputer or a workstation. These apparatuses fully play the role of a station i.e. the role of client and of server. For this, they have sufficient memory and calculation capacities to implement the part of the invention dedicated to them.

Figure 2B:
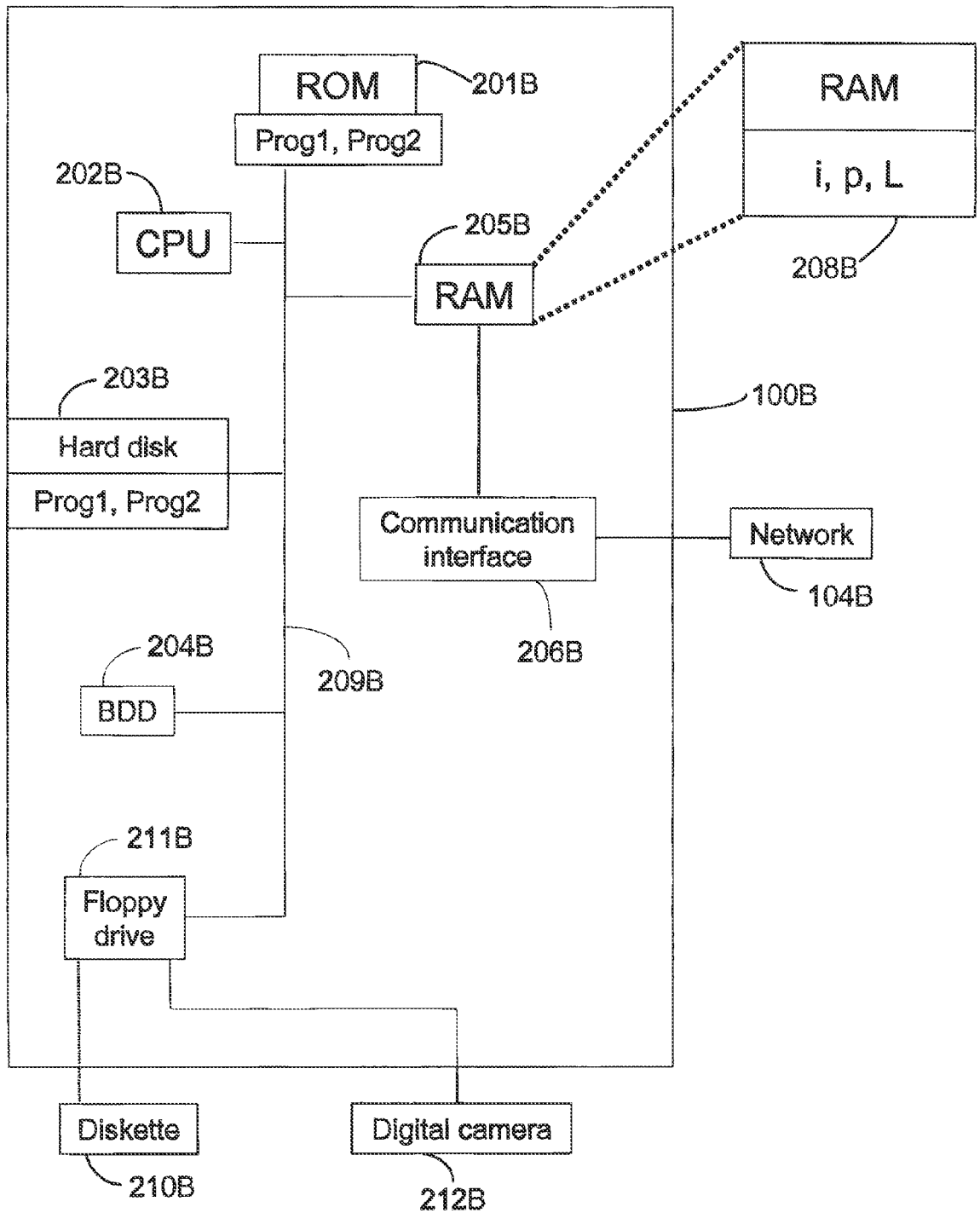
FIG. 2B is a diagram of the programmable apparatus implementing the part of the invention dedicated to the central server according to the second embodiment.

With reference to FIG. 2B, a programmable apparatus implementing the part of the invention dedicated to the central server 100B is described. This part of the invention will be described with reference to FIGS. 8 and 10B.

The apparatus 100B comprises a communication bus 209B to which there are connected:
- a central processing unit 202B (microprocessor), which controls the exchanges between the various components of the apparatus,
- a read only memory 201B, able to contain the programs,
- a random access memory 205B comprising registers 208B adapted to record variables and parameters created and modified during the execution of the programs, in particular the counters i,p, and the list L with reference to FIG. 8,
- a hard disk 203B able to contain the aforementioned programs,
- a disk drive 211B adapted to receive a diskette 210B and to read or write thereon data processed or to be processed according to the invention,
- a communication interface 206B connected to a communication network 104B, for example the Internet, the interface being able to transmit and receive data.

The communication bus affords communication and interoperability between the different elements included in the apparatus 100B or connected to it. The representation of the bus is non-limiting and, in particular, the central processing unit is capable of communicating instructions to any element of the apparatus 100B directly or by means of another element of the apparatus 100B.

The executable code of each program enabling the programmable apparatus to implement the processes according to the invention may be stored, for example, on the hard disk 203B or in read only memory 201B.

According to a variant, the diskette 210B can contain data as well as the executable code of the aforementioned programs which, once read by the apparatus 100B, will be stored on the hard disk 203B.

As a second variant, the executable code of the programs can be received by the intermediary of the communication network 104B, via the interface 206B, in order to be stored in an identical fashion to that described previously.

The diskettes can be replaced by any information carrier such as a compact disc (CD-ROM) or a memory card. Generally, an information storage means, which can be read by a computer or microprocessor, integrated or not into the apparatus, and which may possibly be removable, is adapted to store one or more programs whose execution permits the implementation of the method according to the invention.

More generally, the program or programs may be loaded into one of the storage means of the apparatus 100B before being executed.

The central processing unit 202B controls and directs the execution of the instructions or portions of software code of the program or programs according to the invention, the instructions being stored on the hard disk 203B or the read only memory 201 B or in the other aforementioned storage elements. On powering up, the program or programs which are stored in a non-volatile memory, for example the hard disk 203B or the ROM 201B, are transferred into the RAM 205B, which then contains the executable code of the program or programs according to the invention, as well as registers for storing the variables and parameters necessary for implementation of the invention.

It should be noted that the communication apparatus comprising the device according to the invention can also be a programmed apparatus. This apparatus then contains the code of the computer program or programs, for example, fixed in an application specific integrated circuit (ASIC).

With reference to FIG. 3B, the organization of the information stored on the central server 100B has been described.

According to a preferred embodiment of the invention, the information concerning the shared documents, and the information on the users and the stations will be centralized on the central server 100B. Nevertheless, the invention may be applied to a system which distributes this information (or part of it) to the stations 102B or 103B.

The information stored on the central server is grouped into a look-up table which may be subdivided into three tables:
  a first table termed "Table of users";
  a second table termed "Table of stations";
  a third table termed "Table of indices";

Any user who wishes to share a document is registered with the central server. For this, the user connects to the central server via a Web service or via a graphical application dedicated to the sharing system. According to a preferred embodiment, the Web interface is used. The central server sends a form which the user fills in using a login name and a password. Furthermore, during this procedure, the central server registers the station from which the user is connected as being its reference station (this station having to play the role of data server). Of course, the user may access this registration information so as to modify, for example, its reference station. All this information is stored in the table of users. Furthermore the central server associates a unique identifier with the newly registered user.

The table of stations (IP address, etc.) contains the information making it possible to connect to the station on the basis of its identifier. This table is updated at each connection or disconnection of a registered station. This status of connection or disconnection is, among other things, one of the key conditions which serves to determine whether a data item may be served or not.

It may also be noted that only the stations in their own right are registered in that table.

In what follows, it will not be specified whether a station is thin or not. By default, when a station is referred to, it will be implicit that the station plays the role of client and server.

The fact of separating the registrations of the users from those of the machines makes it possible for each user to access the data sharing system from any station.

The index table is empty when the system starts up. This table comprises an entry composed of four fields for each version of a shared item of data:
  the unique identifier of the shared document,
  the identifier of the version (first or second data item) of the shared document,
  a list of identifiers of stations connected which serve the version of the document,
  a local access path for the case in which the version of the document is stored on the central server.

Two identifiers are associated with each shared document: one, unique, to identify the document, and another to identify the version of that document (original version, thumbnail, etc.).

It should be noted that this index table is updated:
  when a thumbnail is shared,
  when a post no longer serves a version of a document,
  when a station has just retrieved a new version (other than the thumbnail) of a shared document.

This centralized index table makes it possible to implement the conventional search mechanism in a peer-to-peer network described by FIGS. 6, 7 and 8.

Figure 4B:
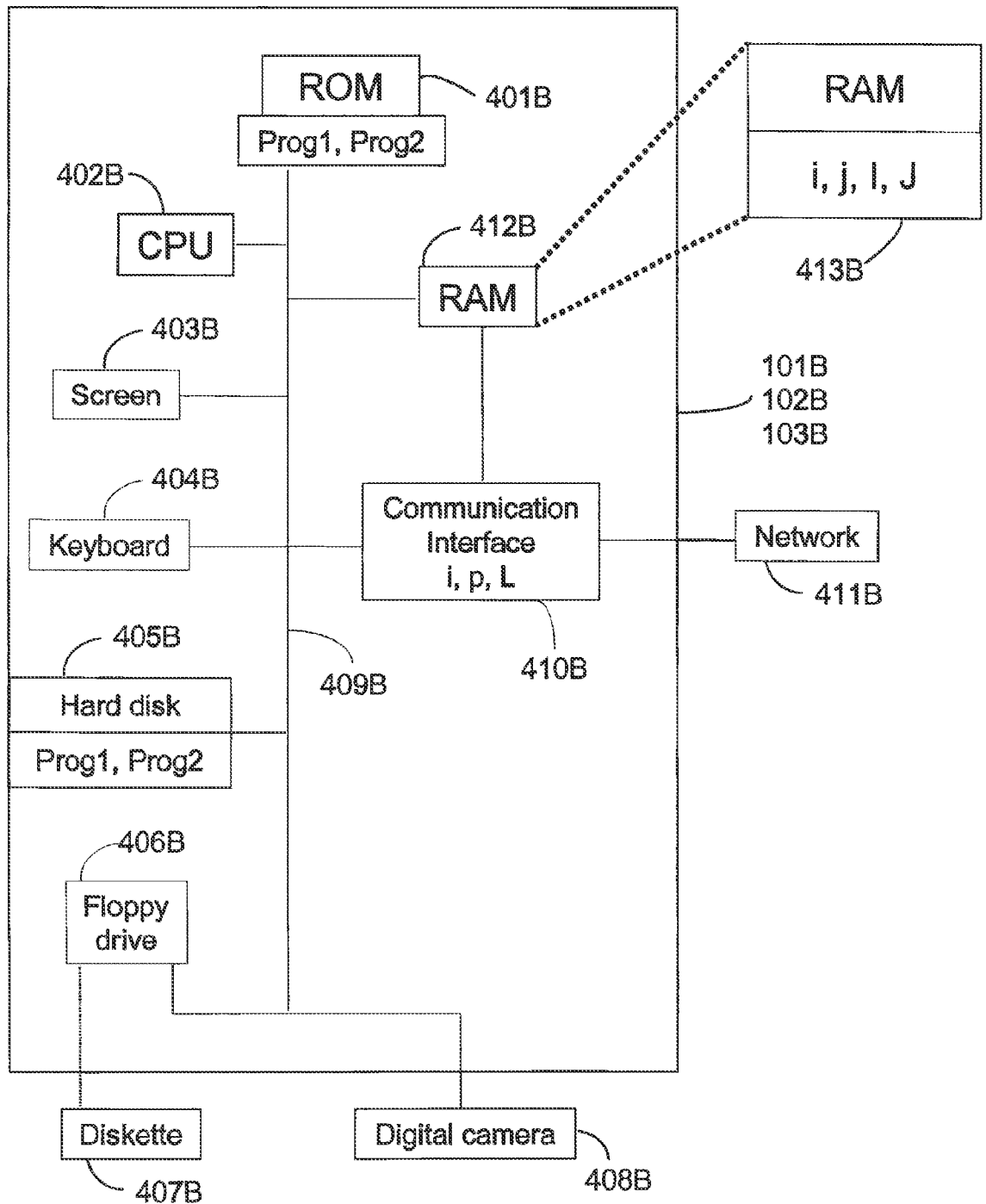
FIG. 4B is a diagram of the architecture of the stations according to the second embodiment.

With reference to FIG. 4B, a programmable apparatus implementing the part of the invention dedicated to the thin station 101A and to the stations 102A and 103A is described. This part of the invention is also described with reference to FIGS. 6, 9B and 11B.

Figure 9B:
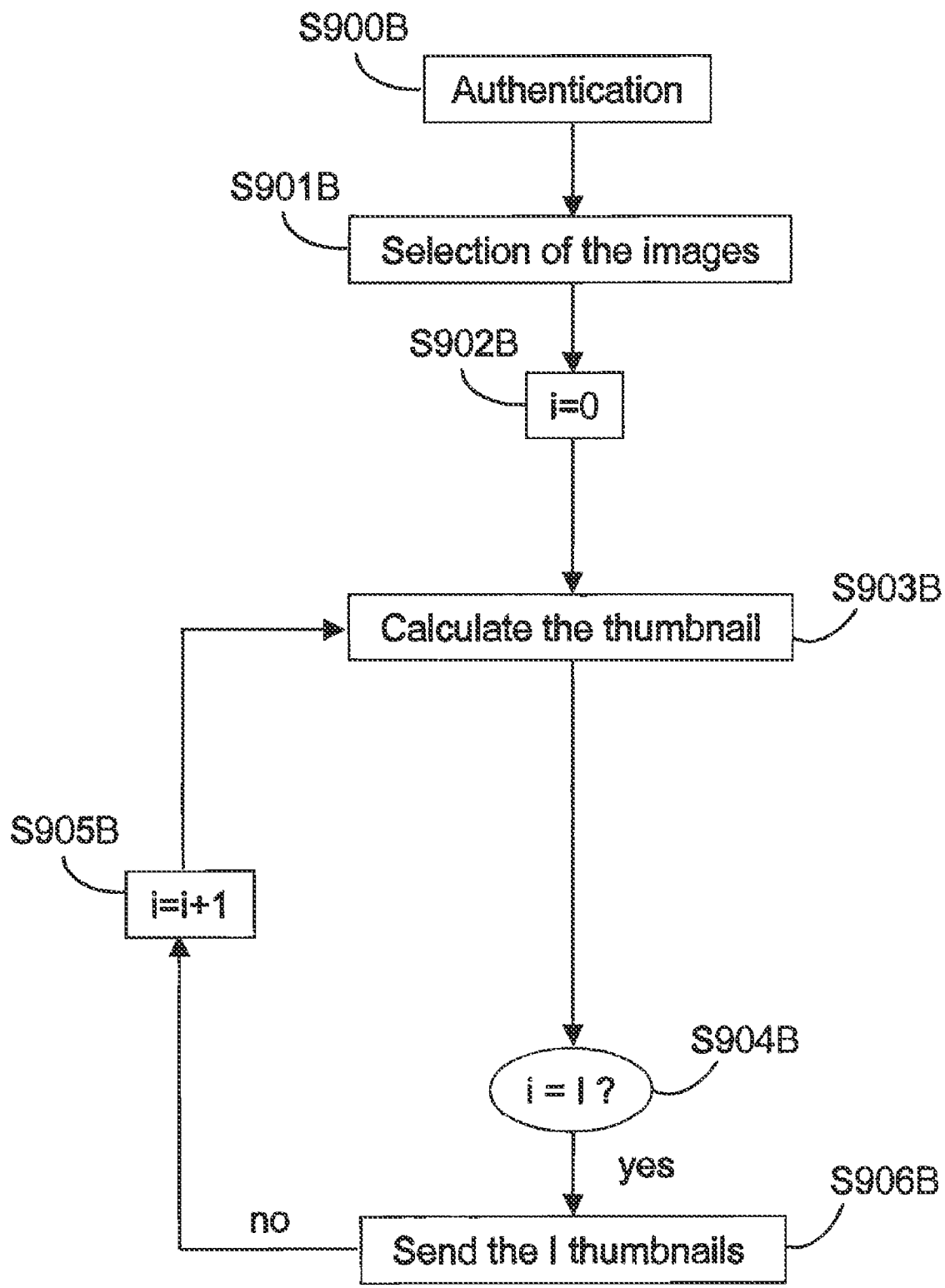
FIG. 9B is a diagram of the part of the invention dedicated to a thin station according to the second embodiment.
Figure 11B:
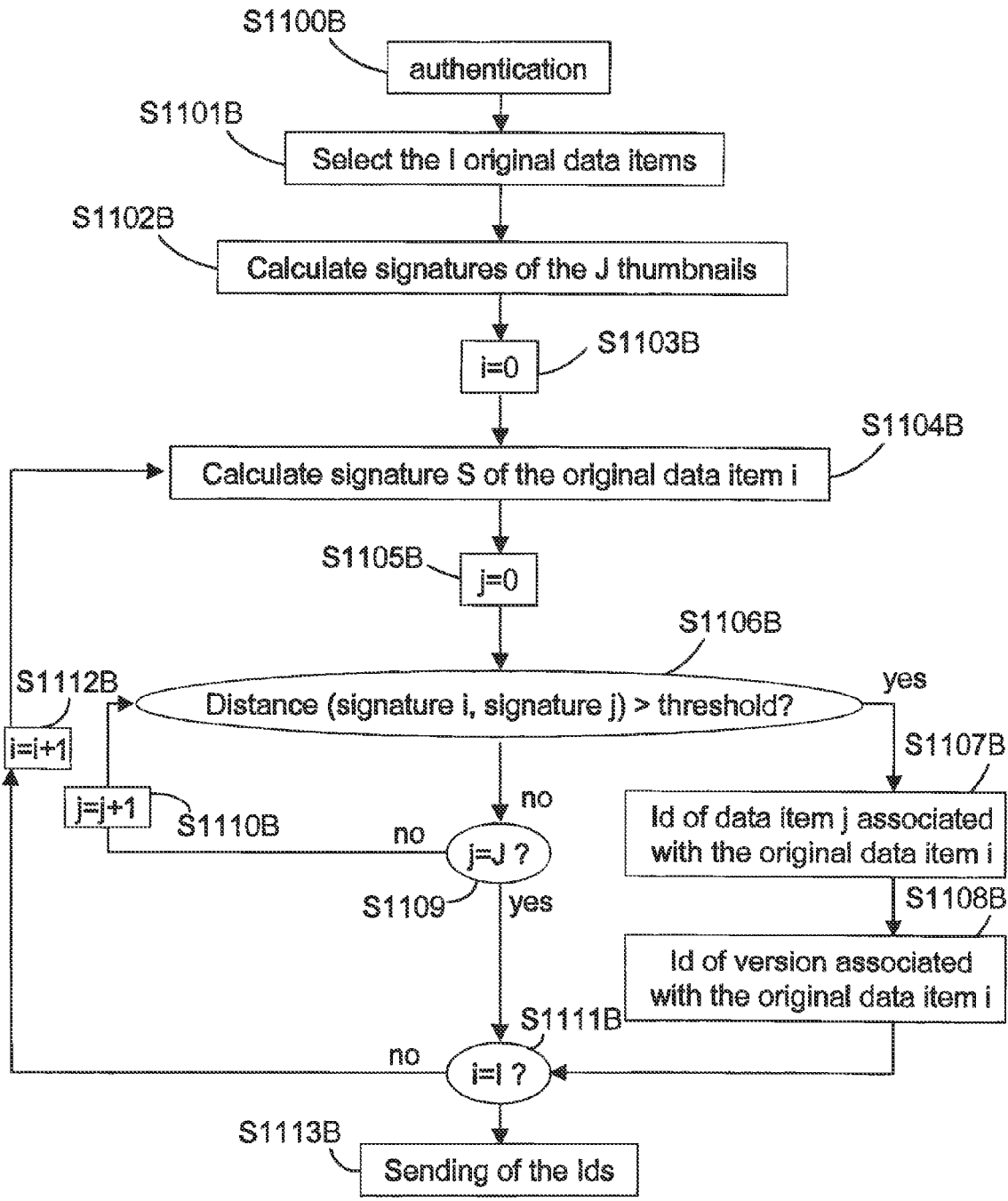
FIG. 11B is a diagram of the steps illustrating the part of the invention dedicated to the reference station according to the second embodiment.

The apparatus 101B, 102B or 103B comprises a communication bus 409B to which there are connected:
  a central processing unit 402B (microprocessor), which controls the exchanges between the various components of the apparatus,
  a read only memory 401B, able to contain the programs,
  a random access memory 412B comprising registers 413B adapted to record variables and parameters created and modified during the execution of the programs, in particular the counters i,j, and the variables I and J, with reference to FIGS. 9B and 11B.
  a screen 403B for displaying data and/or serving as a graphical interface with the user, who will be able to interact with the programs according to the invention, using a keyboard 404B or any other means such as a pointing device, for example a mouse or an optical stylus,
  a hard disk 405B able to contain the aforementioned programs, a disk drive 406B adapted to receive a diskette 407B and to read or write thereon data processed or to be processed according to the invention, a communication interface 410B connected to a communication network 411A, for example the Internet, the interface being able to transmit and receive data.

The communication bus allows communication and interoperability between the different elements included in the microcomputer 101B, 102B or 103B or connected to it. The representation of the bus is non-limiting and, in particular, the central processing unit is able to communicate instructions to any element of the microcomputer 101B, 102B or 103B directly or by means of another element of that microcomputer.

The executable code of each program enabling the programmable apparatus to implement the methods according to the invention may be stored, for example, on the hard disk 405B or in read only memory 401B.

According to a variant, the diskette 407B can contain data as well as the executable code of the aforementioned programs which, once read by the apparatus 101B, 102B or 103B, is stored on the hard disk 405B.

As a second variant, the executable code of the programs can be received by the intermediary of the communication network 411B, via the interface 410B, in order to be stored in an identical fashion to that described previously.

The diskettes can be replaced by any information carrier such as a compact disc (CD-ROM) or a memory card. Generally, an information storage means, which can be read by a computer or microprocessor, integrated or not into the apparatus, and which may possibly be removable, is adapted to store one or more programs whose execution permits the implementation of the method according to the invention.

More generally, the program or programs may be loaded into one of the storage means of the apparatus 101B, 102B or 103B before being executed.

The central processing unit 402B controls and directs the execution of the instructions or portions of software code of the program or programs according to the invention, the instructions being stored on the hard disk 405B or the read only memory 401B or in the other aforementioned storage elements. On powering up, the program or programs which are stored in a non-volatile memory, for example the hard disk 405B or the ROM 401B, are transferred into the RAM 412B, which then contains the executable code of the program or programs according to the invention, as well as registers for storing the variables and parameters necessary for implementation of the invention.

It should be noted that the communication apparatus comprising the device according to the invention can also be a programmed apparatus. This apparatus then contains the code of the computer program or programs for example fixed in an application specific integrated circuit (ASIC).

With reference to FIG. 5, the organization of the information stored on the stations 102B and 103B is described, that is to say on a station having the role of server of shared data.

The table of data enables a version of a data item stored on the station to be accessed on the basis of the version and data identifiers. This table is used when the station receives a request in which those identifiers are specified. The response to a request is described with reference to FIG. 7. This table is not present on the thin stations which do not serve data.

The thumbnails table makes it possible to retrieve the version and document (data) identifiers locally on the basis of a selection made by the user via a graphical interface. This process is described with reference to FIG. 6.

With reference to FIG. 6, the method commonly used has been described which makes it possible to request a version of a shared document on the basis of its identifiers. The method commences with step S600 during which a user selects the image to retrieve. For example, that selection may be made via a graphical interface which displays a set of thumbnails on the screen of the station. Each of these thumbnails corresponds to a shared document. The user selects one of these thumbnails and specifies the version of that data item which he wishes to retrieve. The method interprets this information and generates a string of characters which uniquely identifies the version of that document in the table of thumbnails. Step S601 retrieves the identifiers corresponding to that string and sends them to the central server (S602).

With reference to FIG. 7, the method commonly used has been described which makes it possible for a station to serve a version of a document. Further to a request sent by a requested station (S700), the process extracts the identifiers (S701) of that request and extracts the access path of the table of data (S702). Step S703 consists of sending the data to the requesting station.

With reference to FIG. 8, the mechanism searching for a digital document based on identifiers is described (the mechanism used in most sharing systems comprising a centralized table of indices). The method commences further to a request sent by a user from a station (S602). This request is composed of two identifiers defining the version of the document sought and the identifier of the station which sent the request (so as to be able to send the response to that station).

On reception of that request (S800), the central server extracts the identifiers of the document (S801) and searches for the entry of the index table which corresponds to those two identifiers (S802). Of course, if the entry does not exist, the request is placed on standby. As soon as a new entry is generated, the method tests whether that new entry comprises the document and version identifiers of the request such that the method continues with step S803. Where this data item is available locally ("access path" field filled in) (S803), the central server sends the data item to the station (S804) and the method stops. In the opposite case, the list of the identifiers of the stations is extracted from the entry of the index table (S805). Next, the method retrieves the connection information of each of those stations from the table of stations (S806-S809). It may be recalled that all the stations referenced in that table are connected to the network. As soon as one of them disconnects, it informs the central server which updates the table. The same applies for any new connection or as soon as the connection information of a station changes. This station information is temporarily stored in a list L (S810). If that list is empty (no station connected) (S812), the request is placed on standby until one of them connects (S813). In the opposite case, the central server sends the list L to the requesting station (S814).

When the station which sent the request receives the response, a method analyzes whether the response contains the requested document. If this is the case the search method terminates. If this is not the case, the station sends a request (comprising the two identifiers and the identifier of the requesting station) to each of the stations in turn of the list L extracted on the basis of the response. The method stops when one of the stations serves the requested data.

Two variants may be added to this search mechanism.

1) The central server only sends the information concerning only a single station.

2) The central server sends an ordered list of those stations. The ordering is based on the connection capacities of those stations (bandwidth) or on the presence time of that station (connection time to the network evaluated for a period of time).

With reference to FIG. 9B, the part of the invention dedicated to a thin station has been described. The method consists of sharing a document. This document is stored locally on the station. First of all, the user is authenticated at the central server by him stating his login and password (S900B). The user next selects the original data item or items to share (S901B) For each of them, the method calculates a thumbnail (S903B). The thumbnail is stored locally. Finally, the thumbnails are sent to the central server (S906B).

Figure 10B:
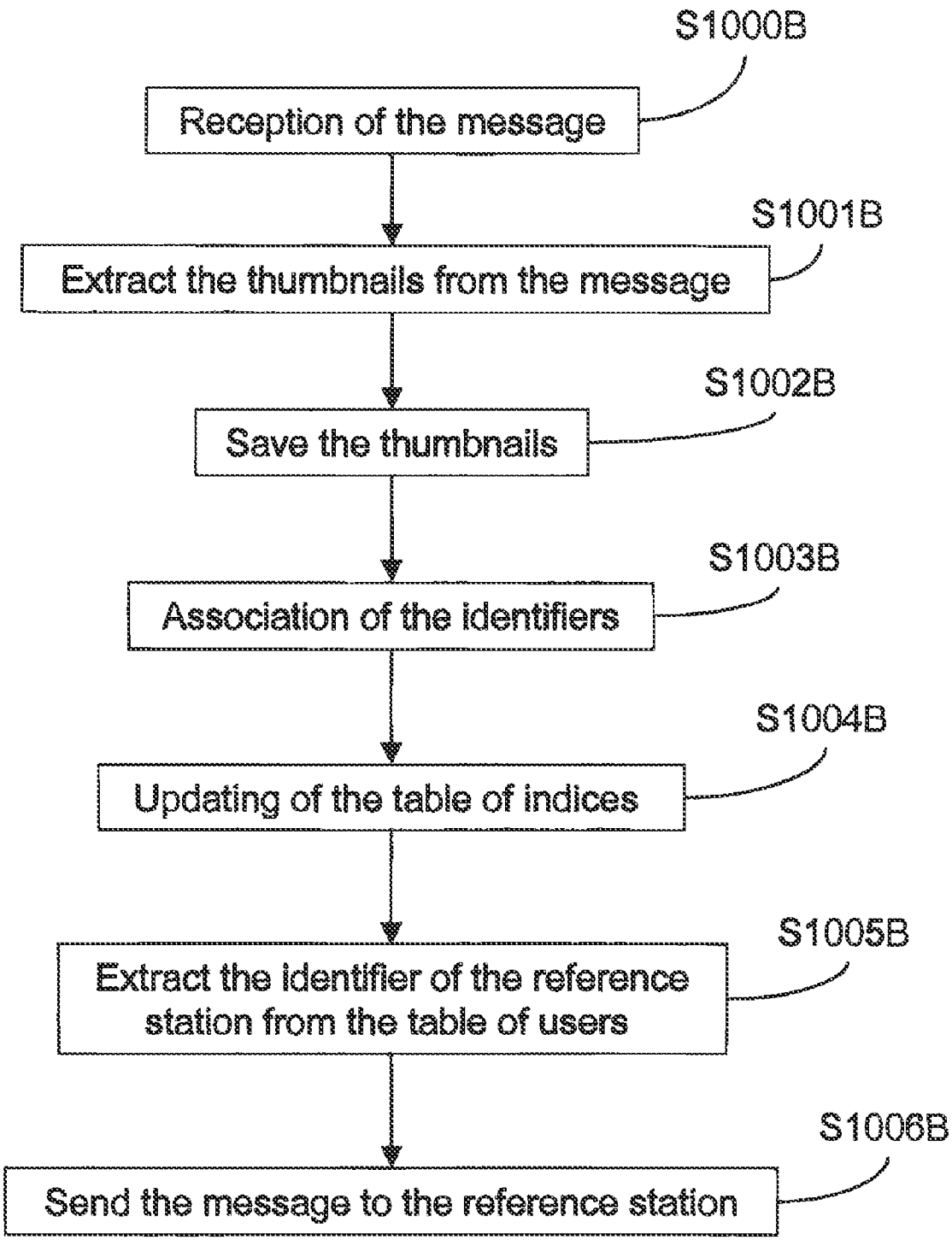
FIG. 10B is a diagram of the method of receiving a message sent in accordance with FIG. 9B according to the second embodiment.

With reference to FIG. 10B the method of receiving a message sent in accordance with FIG. 9B is described (S906B).

On the basis of the message received (S1000B), the central server extracts the list of the thumbnails (S1001B). The thumbnails are stored locally (S1002B). An identifier is associated with each of these thumbnails (S1003B) and the index table is updated (S1004B). For this, a new entry is created in that table for each of the thumbnails received. Each of these entries comprises the identifier of the document, the identifier of the version and the local access path enabling the thumbnail to be accessed. Next, from the table of users, the central server extracts the identifier of the reference station of the user who sent the message (S1005B). The user thus serving information designating the reference station. Finally, a new message is created and sent to that reference station (S1006B). This message contains the thumbnails and identifiers of all the thumbnails received by the central server.

With reference to FIG. 11B, the part of the invention dedicated to the thin station has been described. This part consists of synchronizing the original data (not yet accessible on the network) with the thumbnails shared and referenced in the index table. It may be recalled that the reference station received the thumbnails and the identifiers of the images newly shared from the central server. The number of these thumbnails is J.

The user commences by being authenticated at the central server (S1100B). Next he selects the original data stored on the station. It may be noted that if that data was created from a thin station (mobile phone, or any other apparatus), that original data is loaded on the reference station in a predefined folder, for example, at the time of the installation of the invention on that station (S1101B). Furthermore, it is possible for that data not to correspond to the thumbnails received. At that moment, the method described below is put on standby until other data is loaded onto the station. For reasons of clarity, in what follows it is considered that each thumbnail may be matched with a loaded data item, this in no way limiting the invention.

For each of the J thumbnails received, the method calculates a data item characteristic of the content of that data item termed in what follows the signature S (S1102B). For example, in the case of images, a color histogram is calculated on the basis of the thumbnail.

For each of the I original data items loaded, the method also calculates that signature (S1104B). It may be noted that, when the signature is a color histogram, the signature is extracted on the basis of the original image reduced to the resolution of the thumbnail.

This signature is next compared to each of the J signatures associated with the thumbnails received (S1106B). For this, a metric is defined between two signatures i and j.

In the case of color histograms, a distance defined in M. J. Swain, D. H. Ballard, "Color Indexing", Inter. Journal of Comp. Vision, 7:1, pp 11-32, 1991 may for example be used. This distance has the value 1 if both signatures are equal and 0 otherwise. For intermediate values, if the distance is greater than a threshold, step S1106B is followed by step S1107B which associates the data identifier matching data item j with the current original data item i. As a variant, the method may be caused to request a confirmation of matching between an original data item and two thumbnails in case the decision could not be taken on the basis of the values of that distance.

Once that method of matching has terminated, that is to say that each thumbnail has been fitted with an original data item, the station sends the central server a message comprising the list of the identifiers (document and version identifiers) and the identifier of the reference station (S1113B). In this manner, the central server updates the table of indices by adding new entries to that table. Thus, the central server is informed about the fact that a new station can serve original data items.

Figure 13B:
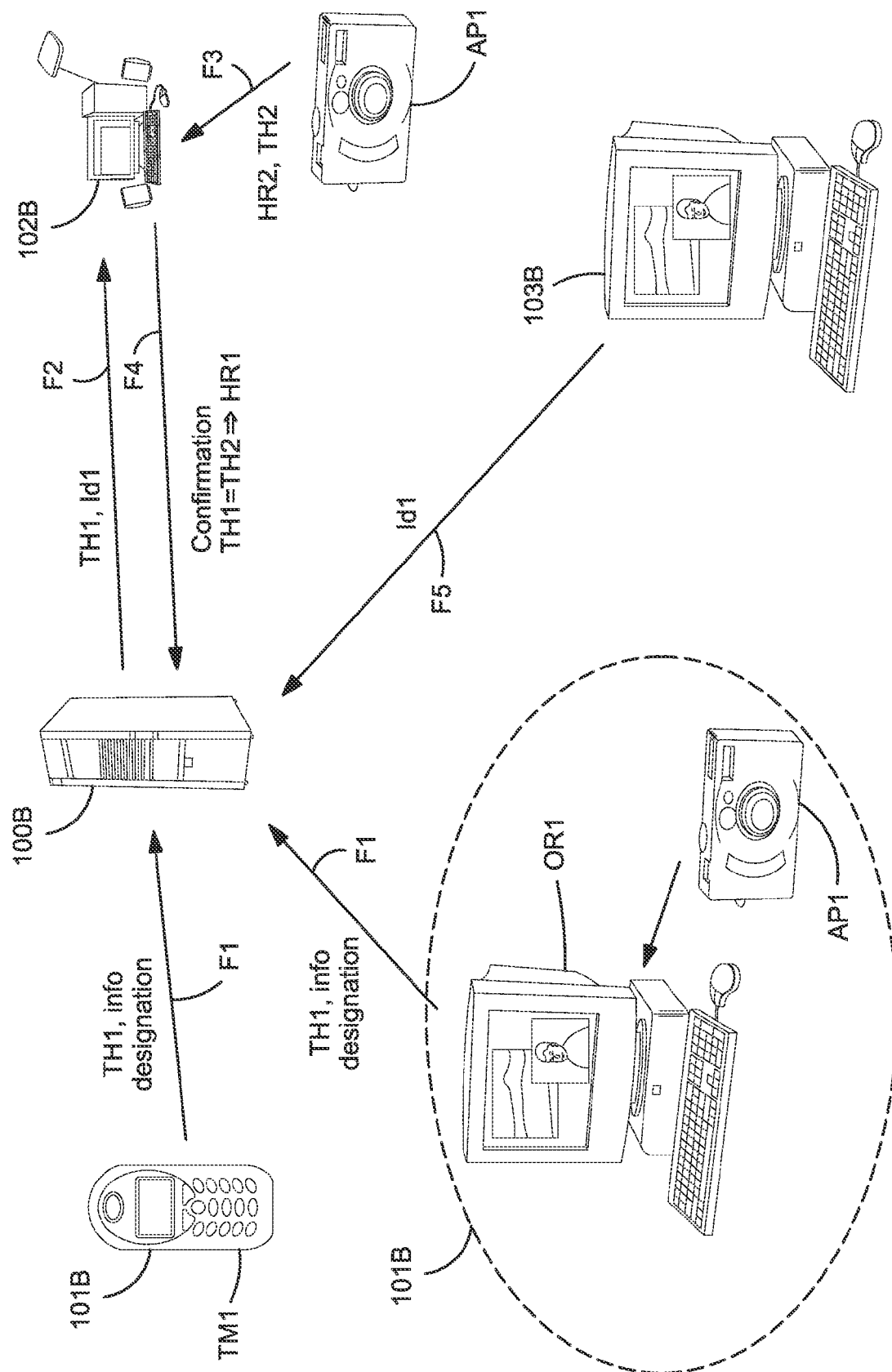
FIG. 13B is a diagram of the steps of the method of sharing a document of photograph type in accordance with the invention according to the second embodiment.

With reference to FIGS. 1B and 13B, the general steps have been described of the method of sharing a document of photograph type in accordance with the invention:

For example, further to some photographs having been taken with a camera AP1, a sending user wishes to share those photographs (or some of them) from a thin station 101B (typically a mobile telephone TM1).

The thin station may also be a computer OR1 which does not belong to him, such as a publicly accessible computer. In this case, the user temporarily loads the photographs of the camera AP1 onto the public computer OR1 in order to send them to a station of the network, for example the central server 100B.

Thus, the station 101B sends the first data item TH1 (a thumbnail) of a first digital document DD1, to the central server 100B. He may also send the identifier Id1 of the document DD1 or the latter may be created by the central server 100B. Station 101B also sends an item of information for designating a reference station 102B, typically its user identifier. This action is illustrated by the arrow F1 with reference to FIG. 13B.

The second data item HR1 of the digital document DD1 is not yet available on the network. The second data item HR1 is for example the original data item at full resolution of the first document DD1 whereas the first data item is a thumbnail TH1 of lower resolution, which corresponds to a first edition relationship of hierarchical type between the first and second data items of the first digital document DD1 to share according to the invention.

The central server 100B which receives, among others, that designation information item, selects the reference station 102B to which it sends the first data item TH1 of the first digital document and its identifier Id1 (action F2).

This selection may also be made according to a selection criterion linked to a characteristic of the reference station 102B, for example its time of presence or the bandwidth available at that station.

The central server 100B may make available the first data item TH1 of the first digital document DD1 and its identifier Id1 to any user of the network who requests this and in particular station 103B.

The photographer who returns to his reference station 102B, downloads from his camera AP1, from his memory card or from his mobile phone TM1, a second data item HR2 of a second digital document DD2 (action F3). The first and second digital documents DD1 and DD2 are connected to each other here by a second chosen geographical and temporal edition relationship.

Station 102B deduces therefrom a first data item TH2 of that second digital document DD2. It should be noted that the second data item HR2 of the second document DD2 is probably the same as the second data item HR1 of the first document DD1 whereas the first data item TH2 of the second document may be different from the first data item TH1 of the first document according to the subsampling methods performed by the different apparatuses AP1 and 102B.

Thus, to confirm that the two second data items of the two documents DD1 and DD2 are indeed identical, station 102B performs an operation of comparing the first data item TH1 of the first document DD1 which it received from the station 100B with the first data item TH2 of the second document DD2.

In case of positive comparison, the identifier Id1 of the first document DD1 is attributed to the second digital document DD2. Station 102B then sends confirmation of reception of the second data item HR1 of document DD1 to the central server 100B (action F4).

The latter then knows that the original data item HR1 of the first document DD1 is available and may thus be served.

If a user requests the original data item HR1 from a station 103B via the identifier of the document Id1 (action F5), the central server 100B may deliver the original data item HR1 of document DD1, from or via the reference station 102B.

The invention claimed is:

1. A method of controlling a center station which communicates with a plurality of stations sharing a digital document in a communication network, comprising the steps of:
   a) receiving a thumbnail data item comprised in a first station and a thumbnail data item comprised in a second station;
   b) calculating a signature from each of the received thumbnail data items;
   c) comparing the calculated signatures of the received thumbnail data items based on a difference and a threshold calculated from the thumbnail data items; and
   d) transmitting information for accessing an original data item related to the thumbnail data item comprised in the first station to the second station according to a result of the comparison.

2. A method according to claim 1, wherein the thumbnail data item comprised in the second station is generated in the first station.

3. A method according to claim 1, wherein color histograms each based on the thumbnail data items are calculated as the signatures in said calculating step.

4. A method according to claim 1, wherein said communication network is a peer-to-peer network.

5. A method according to claim 1, wherein the first station is a digital camera apparatus and generates the original data item.

6. A device for controlling a center station which communicates with a plurality of stations sharing a digital document in a communication network, comprising:
   a) a receiver that receives a thumbnail data item comprised in a first station and a thumbnail data item comprised in a second station;
   b) a calculator that calculates a signature from each of the received thumbnail data items;
   c) a comparator that compares the calculated signatures of the received thumbnail data items based on a difference and a threshold calculated from the thumbnail data items; and
   d) a transmitter that transmits information for accessing an original data item related to the thumbnail data item comprised in the first station to the second station according to a result of the comparison performed by the comparator.

7. A computer-readable medium, storing instructions of a computer program, wherein the stored instructions are executed by a computer or a microprocessor to implement the following steps:
   a) receiving a thumbnail data item comprised in a first station and a thumbnail data item comprised in a second station;
   b) calculating a signature from each of the received thumbnail data items;
   c) comparing the calculated signatures of the received thumbnail data items based on a difference and a threshold calculated from the thumbnail data items; and
   d) transmitting information for accessing an original data item related to the thumbnail data item comprised in the first station to the second station according to a result of the comparison.

* * * * *